United States Patent
Matthews et al.

(10) Patent No.: US 10,291,958 B2
(45) Date of Patent: *May 14, 2019

(54) SYSTEMS AND METHODS FOR DETERMINING AUDIENCE ENGAGEMENT BASED ON USER MOTION

(71) Applicant: Rovi Guides, Inc., San Jose, CA (US)

(72) Inventors: Sean Matthews, Los Altos, CA (US); Benjamin Maughan, Pleasanton, CA (US); Kevin Bruce Lenhart, Campbell, CA (US); Paul T. Stathacopoulos, San Carlos, CA (US); William K. Corry, Coatesville, PA (US)

(73) Assignee: Rovi Guides, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/852,756

(22) Filed: Dec. 22, 2017

(65) Prior Publication Data
US 2018/0205990 A1 Jul. 19, 2018

Related U.S. Application Data

(63) Continuation of application No. 15/399,231, filed on Jan. 5, 2017, now Pat. No. 9,854,292.

(51) Int. Cl.
| | |
|---|---|
| H04N 7/18 | (2006.01) |
| H04N 21/442 | (2011.01) |
| H04N 21/466 | (2011.01) |
| G06F 7/02 | (2006.01) |
| G06F 17/30 | (2006.01) |

(Continued)

(52) U.S. Cl.
CPC ......... *H04N 21/44218* (2013.01); *G06F 7/02* (2013.01); *G06F 17/30377* (2013.01); *G06F 17/30477* (2013.01); *H04N 21/252* (2013.01); *H04N 21/278* (2013.01); *H04N 21/435* (2013.01); *H04N 21/4667* (2013.01); *H04N 21/4668* (2013.01); *H04N 21/6582* (2013.01)

(58) Field of Classification Search
CPC ......... H04N 21/44222; H04N 21/6582; H04N 21/4532; H04N 21/812; H04N 21/25891; H04N 21/5582; H04N 21/4394
USPC .............................. 725/9–21; 709/217–232
See application file for complete search history.

(56) References Cited

U.S. PATENT DOCUMENTS

| | | | |
|---|---|---|---|
| 6,239,794 | B1 | 5/2001 | Yuen et al. |
| 6,564,378 | B1 | 5/2003 | Satterfield et al. |

(Continued)

*Primary Examiner* — Annan Q Shang
(74) *Attorney, Agent, or Firm* — Haley Guiliano LLP

(57) ABSTRACT

Systems and methods are described for measuring audience engagement for a media asset using user motion. For example, a media guidance application may receive movement logs from a plurality of user equipment. These movement logs may contain information indicating when each of the plurality of users moved, as detected by motion sensors, while the user equipment was generating for display a media asset. The movement logs may be analyzed to determine time periods during the media asset during which greater than a certain number of the plurality of users were moving. These time periods may in turn be used to infer how engaged the plurality of users were during the media asset or what portions of the media asset the plurality of users viewed. This data may be used to determine in what media assets, or portions thereof, supplemental video content should be inserted.

20 Claims, 12 Drawing Sheets

(51) Int. Cl.
*H04N 21/25* (2011.01)
*H04N 21/658* (2011.01)
*H04N 21/278* (2011.01)
*H04N 21/435* (2011.01)

(56) References Cited

U.S. PATENT DOCUMENTS

| | | |
|---|---|---|
| 7,165,098 B1 | 1/2007 | Boyer et al. |
| 7,761,892 B2 | 7/2010 | Ellis et al. |
| 8,046,801 B2 | 10/2011 | Ellis et al. |
| 8,291,453 B2 | 10/2012 | Boortz |
| 8,307,392 B2 | 11/2012 | Ahanger et al. |
| 8,560,387 B2 | 10/2013 | Amidon et al. |
| 8,713,593 B2 | 4/2014 | Humphrey et al. |
| 8,922,480 B1* | 12/2014 | Freed ................ G09G 5/00 345/156 |
| 9,014,546 B2 | 4/2015 | Shimy et al. |
| 9,313,537 B2 | 4/2016 | Tang et al. |
| 9,807,454 B2* | 10/2017 | Archibong ........ H04N 21/4402 |
| 9,936,239 B2* | 4/2018 | Pogorelik ........ H04N 21/25891 |
| 2002/0174430 A1 | 11/2002 | Ellis et al. |
| 2005/0251827 A1 | 11/2005 | Ellis et al. |
| 2006/0023915 A1 | 2/2006 | Aalbu et al. |
| 2009/0052859 A1 | 2/2009 | Greenberger et al. |
| 2010/0070987 A1 | 3/2010 | Amento et al. |
| 2010/0076850 A1 | 3/2010 | Parekh et al. |
| 2010/0153885 A1 | 6/2010 | Yates |
| 2010/0162285 A1 | 6/2010 | Cohen et al. |
| 2012/0072939 A1 | 3/2012 | Crenshaw et al. |
| 2012/0093481 A1 | 4/2012 | McDowell et al. |
| 2012/0124604 A1* | 5/2012 | Small ................ H04N 21/4223 725/12 |
| 2012/0297409 A1* | 11/2012 | Zaslavsky ........ H04N 21/25883 725/10 |
| 2013/0152113 A1 | 6/2013 | Conrad et al. |
| 2013/0232515 A1 | 9/2013 | Rivera et al. |
| 2013/0312018 A1* | 11/2013 | Elliott ................ H04N 21/45 725/12 |
| 2014/0331242 A1* | 11/2014 | De La Garza ... H04N 21/44218 725/12 |
| 2014/0337868 A1 | 11/2014 | Garza et al. |
| 2014/0344017 A1* | 11/2014 | Deephanphongs ........................... H04N 21/25866 705/7.29 |
| 2015/0067710 A1 | 3/2015 | Bhogal et al. |
| 2015/0382047 A1 | 12/2015 | Van Os et al. |
| 2017/0026442 A1* | 1/2017 | Archibong ........ H04L 65/4084 |
| 2017/0223427 A1 | 8/2017 | Zaslavsky et al. |
| 2017/0230709 A1 | 8/2017 | Van Os et al. |

* cited by examiner

US 10,291,958 B2

SYSTEMS AND METHODS FOR DETERMINING AUDIENCE ENGAGEMENT BASED ON USER MOTION

CROSS-REFERENCE TO RELATED APPLICATION

This application is a continuation application of U.S. patent application Ser. No. 15/399,231, filed Jan. 5, 2017 (now pending), the disclosure of which is hereby incorporated by reference herein in its entirety.

BACKGROUND

Supplemental content providers have a large number of time slots to fill with supplemental content. Traditionally, audience measurement companies use survey results or audience size and demographic data to determine which time slots would be the most valuable and would allow for their supplemental content to reach the widest audience. However, while the audience size measurements may indicate how many users have chosen to display a program, audience size measurements may not indicate whether those users actually watched the program. For example, a user may choose to display the news while cooking dinner and may not view any of the program, including the supplemental content. Measuring audience engagement across the duration of the program may allow for supplemental content providers to understand whether users are actually watching the program. Current methods of measuring audience engagement rely on specialized equipment with complicated outputs, such as biometric sensors, to gather audience engagement information.

SUMMARY

Accordingly, systems and methods are described herein for measuring audience engagement based on user motion. The systems and methods may be used to allow supplemental content providers to more intelligently choose time slots during programs or portions of programs in which users are more likely to be engaged in the program, and thus will be more likely to view the supplemental content. In particular, user motion may be a useful measurement in determining audience engagement because a user moving during playback of a program or media asset may be indicative that the user is likely less engaged or not engaged at all in the program or media asset. Further, motion sensors with connectivity capability are becoming increasingly prevalent in homes, allowing motion sensor data, which is relatively simple in nature, to be gathered at scale. Thus, meaningful inferences regarding audience engagement may be made. Therefore, the use of motion sensors in monitoring audience engagement is a simple and effective source from which to gather audience engagement data and to make meaningful conclusions about audience engagement, which can be used to determine when, and during what programs, supplemental video content providers should focus their attention.

For example, a media guidance application may receive movement logs from a plurality of user equipment containing information gathered from motion sensors corresponding to the plurality of user equipment. These movement logs may contain information indicating when each of the plurality of users moved while the user equipment was generating for display a media asset (i.e., a computer was displaying the movie "Forrest Gump"). For example, the movement log may indicate that a user moved from 6:35 PM to 6:45 PM, which, when compared to viewership data that indicates that the media asset began at 6:30 PM, may indicate that the user moved from the fifth minute to the fifteenth minute of the media asset. The media guidance application may analyze the movement logs to determine time periods during the media asset during which greater than a certain number of the plurality of users were moving. These time periods may in turn be used to infer how engaged the plurality of users were during the media asset, how much of the media asset the plurality of users viewed or paid attention to, or what portions of the media asset the plurality of users viewed.

In some aspects, a media guidance application (e.g., executed by control circuitry of a server) may determine that a plurality of user equipment corresponding to a plurality of users are generating for display a media asset. A first user of the plurality of users may correspond to a first user equipment, and a second user of the plurality of users may correspond to a second user equipment. The media guidance application may receive indications for requests for media from the plurality of user equipment, and may determine, based on the indications, that the plurality of user equipment are generating for display the media asset. As an illustrative example, the media guidance application may determine that an indication of the plurality of indications indicates that the first user requested, using a computer, to view "Forrest Gump" at 6:30 PM. Based on the indication, the media guidance application may determine that the computer is generating for display "Forrest Gump" at 6:30 PM.

As another illustrative example, an indication in the plurality of indications may comprise an indication of a source and an indication of the time of the request. For instance, the media guidance application may determine that the indication indicates that the first user requested to change the channel on the first user equipment (e.g., a set-top box) to channel 3 at 6:30 PM. The media guidance application may receive a data table that indicates that a plurality of sources are providing a plurality of media assets at a plurality of display times. For instance, the data table may be a table of all of the channels currently being broadcast, and what media assets are being broadcast at various times on each of the channels. The media guidance application may compare the source to the plurality of sources and the time to the plurality of display times to determine that the request is associated with the media asset. For instance, the media guidance application may determine that "Forrest Gump" is being displayed on channel 3 from 6:30 PM to 10:30 PM by consulting the data table, and that the request is therefore associated with the media asset "Forrest Gump." Based on the determination, the media guidance application may determine that the first user equipment is generating for display the media asset "Forrest Gump" at 6:30 PM.

In some embodiments, the media guidance application may receive a first movement log from the first user equipment and a second movement log from the second user equipment. Each of the first and second movement logs may comprise a data structure, which may represent a plurality of movement events occurring while the user equipment from which the movement log is received is generating for display the media asset. The movement events may be detected using a motion sensor that may be associated with (or subsequently associated with) the user equipment from which the movement log is received. For example, the data structure of the first movement log may indicate that the first user moved from 6:35 PM to 6:45 PM and 7:05 PM to 7:10 PM, which may correspond to the fifth minute to the fifteenth minute and the thirty-fifth minute to the fortieth minute, respectively, of the display of "Forrest Gump" on the first user equipment, as "Forrest Gump" started at 6:30 PM. A motion sensor located next to the first user equipment may have detected the movement events occurring from 6:35 PM to 6:45 PM and 7:05 PM to 7:10 PM.

In some embodiments, the media guidance application may identify a first portion of the media asset during which the first user was moving based on the data structure of the first movement log. For example, the media guidance application may receive the first movement log from the first user equipment corresponding to the first user, and may determine, based on the data structure of the first movement log, that the first user moved from 6:35 PM to 6:45 PM. The media guidance application may identify, based on determining that the first user moved from 6:35 PM to 6:45 PM, the fifth to the fifteenth minute of the display of "Forrest Gump" as a first portion of the media asset during which the first user moved.

In some embodiments, the media guidance application may identify a second portion of the media asset during which the second user was moving based on the data structure of the second movement log. For example, the second user may have started watching "Forrest Gump" on a computer corresponding with the second user at 8:30 PM. The media guidance application may determine, based on the data structure of the second movement log, that the second user moved from 8:40 PM to 8:50 PM. The media guidance application may determine, based on the data structure of the second movement log, that the second portion of "Forrest Gump" during which the second user was moving was from the tenth minute to the twentieth minute of "Forrest Gump."

In some embodiments, the media guidance application may determine an overlapping portion of the media asset during which both the first and second users were moving based on the first and second portions. For example, the media guidance application may compare the second portion during which the second user moved, for example, the tenth minute to the twentieth minute of "Forrest Gump," to the first portion during which the first user moved, for example, the fifth minute to the fifteenth minute of "Forrest Gump." The media guidance application may determine, by comparing the first portion to the second portion that both the first and second users were moving from the tenth minute to the fifteenth minute of "Forrest Gump," and may therefore determine that the overlapping portion lasts from the tenth minute to the fifteenth minute.

In some embodiments, the media guidance application may determine a number of users corresponding to a portion of the plurality of user equipment that were moving during the entirety of the overlapping portion of the media asset based on additional movement logs received from the plurality of user equipment. For instance, the media guidance application may receive 98 additional movement logs from the plurality of user equipment. After the media guidance application analyzes the data structures of the additional movement logs, the media guidance application may determine that 28 users, not including the first and second users, were moving for the entirety of the tenth to fifteenth minute of "Forrest Gump." Thus, the media guidance application may determine that the total number of users that were moving for the entirety of the tenth to fifteenth minute of "Forrest Gump" is 30 users, including the first and the second users.

In some embodiments, the media guidance application may compute a value indicating how many of the plurality of users were moving for an entirety of the overlapping portion based on the determined number of users. For example, the media guidance application may determine that 30 users were moving for the entirety of the tenth to fifteenth minute portion of "Forrest Gump," and that the media guidance application received a total of 100 movement logs. The media guidance application may determine that the value indicating how many of the plurality of users were moving for an entirety of the overlapping portion is 0.30, or 30% of the plurality of users.

The media guidance application may determine that the first user equipment corresponds to a third user. For example, the first user may be watching "Forrest Gump" with the third user. The media guidance application may receive a third movement log from the first user equipment comprising a data structure representing a plurality of movement events associated with movement of the third user. The motion sensor located next to the first user equipment, or a second motion sensor associated with the first user equipment, may have detected the movement events. The media guidance application may determine, based on the data structure of the third movement log, whether the third user was moving during the entirety of the overlapping portion. For example, the media guidance application may determine, based on the data structure of the third movement log, that the third user was moving from 6:32 PM to 7:00 PM, which may correspond to the second minute to the thirtieth minute of the display of "Forrest Gump," the delivery of which may have started at 6:30 PM. The media guidance application may determine that the third user was therefore moving for the entirety of the tenth to the fifteenth minute of "Forrest Gump." In response to determining that the third user was moving during the entirety of the overlapping portion, the media guidance application may increase the value indicating how many of the plurality of users were moving for the entirety of the overlapping portion. For example, the media guidance application may now determine that the number of users that were moving during the entirety of the overlapping portion was 31 after the media guidance application received 101 movement logs. Therefore, the media guidance application may increase the value indicating how many of the plurality of users were moving for the entirety of the overlapping portion from 0.30 or 30% to 0.3069 or 30.69%.

In some embodiments, the media guidance application may compute a movement amount of the media asset during which the users corresponding to the portion of the plurality of user equipment were moving based on the overlapping portion and based on determining that the value indicating how many of the plurality of users were moving for the entirety of the overlapping portion exceeds a threshold value. For instance, the media guidance application may access a threshold value from a database. The threshold value may be, for example, 25%. The media guidance application may determine that the value indicating how many of the plurality of users were moving for the entirety of the overlapping portion was 30.69%, and thus the value exceeds the threshold value of 25%. Based on this determination, the media guidance application may include the overlapping portion from the tenth to the fifteenth minute of "Forrest Gump" when computing the movement amount of "Forrest Gump." For example, other overlapping portions may include from the sixtieth minute to the ninetieth minute of "Forrest Gump", and the one-hundredth minute to the one-hundred and twenty-fifth minute of "Forrest Gump." The media guidance application may sum all of the overlapping portions to determine that the movement amount of "Forrest Gump" was sixty minutes. As another illustrative example, the media guidance application may determine that the display duration of "Forrest Gump" was four hours, and may determine that the movement amount of "Forrest Gump" was 25%.

In some embodiments, the media guidance application may infer how much of the media asset was viewed by the plurality of users. For example, the media guidance application may calculate a viewing amount indicating how much of the media asset was viewed by the plurality of users. In some embodiments, the media guidance application may access a function correlating the movement amount of the media asset to the viewing amount. The function may be any suitable function, and may inversely correlate the movement amount and the viewing amount. For example, the media guidance application may determine that the movement amount of "Forrest Gump" was 25%, and may determine that the function indicates that the viewing amount is one minus the movement amount. The media guidance application may evaluate the function to determine the viewing amount. For example, the media guidance application may determine that the viewing amount for "Forrest Gump" was 75%. In some embodiments, the function may take the total number of movement events from the plurality of movement logs as an input. For example, the media guidance application may determine the total number of movement events by analyzing the number of movement events in each movement log, and by then summing each number of movement events in each movement log to determine the total number of movement events. For example, the media guidance application may determine that there were 5000 movement events occurring during the display of "Forrest Gump" in the 101 movement logs. The media guidance application may execute the function to determine the viewing amount, which may be, for example, 60% based on the 5000 movement events.

In some embodiments, the data structure associated with the first movement log may comprise a plurality of movement intensities associated with the plurality of movement events associated with the first movement log. The movement intensities may be calculated based on the distance of the movement event, displacement of the movement event, the speed of the movement event, the velocity of the movement event, or any other suitable metric associated with the movement event.

The media guidance application may determine a subset of the movement events associated with the first movement log, the subset of the movement events occurring during the overlapping portion. For example, the media guidance application may determine that a first movement event involved the first user moving his right hand between the tenth minute to the eleventh minute of "Forrest Gump." The media guidance application may further determine that a second movement event involved the first user moving across the room and back from the eleventh minute to the fifteenth minute of "Forrest Gump." The media guidance application may determine that the first movement event is associated with a relatively low movement intensity, for example, a movement intensity of 1 on a scale of 0 to 10. The media guidance application may determine that the second movement event is associated with a relatively large movement intensity, for example, a movement intensity of 8.5 on a scale of 0 to 10. One of ordinary skill in the art would appreciate that there are many ways of rating intensity, and a scale of 0 to 10 is used merely as an illustrative example. The media guidance application may compute an aggregated movement intensity based on the subset of movement events. For example, the media guidance application may compute the aggregated movement intensity by computing a weighted average of the two movement intensities. Here, the media guidance application may determine that the aggregated movement intensity is 7.0 on a scale of 0 to 10.

The media guidance application may then compare the aggregated movement intensity to a threshold movement intensity, and, based on determining that the aggregated movement intensity exceeds the threshold movement intensity, the media guidance application may determine that the first user was moving during the overlapping portion. For example, the media guidance application may determine that the threshold movement intensity is 5.0, and the media guidance application may therefore determine that the aggregated movement intensity of 7.0 for the first user during the overlapping portion exceeds the threshold movement intensity, and therefore determine that the first user was moving during the overlapping portion.

In some embodiments, the media guidance application may infer how much of the media asset was viewed by the plurality of users based on determining that the first user was moving during the overlapping portion and the aggregated movement intensity. For example, the function correlating the movement amount and the viewing amount may be dependent on the movement intensity of all the movement events of the plurality of users that moved during the overlapping portion. For instance, if the media guidance application determines that the movement events were associated with, on average, high intensities, then the viewing amount may be decreased from 75% to 70%. In another illustrative example, if the media guidance application determines that the movement events were associated with, on average, low intensities, then the viewing amount may be increased from 75% to 80%. In some embodiments, if the media guidance application determines that the aggregated movement intensity is less than the threshold movement intensity, the media guidance application may not include the overlapping portion in the inference of how much of the media asset was viewed by the plurality of users. For example, the media guidance may not include the overlapping portion in the calculation of the movement amount or the viewing amount, which may increase the viewing amount, for example, from 75% to 77%.

In some embodiments, the media guidance application may track a first movement amount for a first plurality of users to get the engagement in the media asset and may track a second movement amount for a second plurality of users to get the engagement in a second media asset. The media guidance application may determine a second viewing amount for the second media asset which represents how much of a second media asset was viewed by a second plurality of users. For example, the media guidance application may determine that the second viewing amount for the movie "Pulp Fiction" was 60%. The media guidance application may compare the first viewing amount for the first media asset to the second viewing amount to determine whether the first viewing amount exceeds the second viewing amount. For example, the media guidance application may compare the first viewing amount of 75% for "Forrest Gump" to the second viewing amount of 60% for "Pulp Fiction" and determine that the first viewing amount for "Forrest Gump" exceeds the second viewing amount for "Pulp Fiction." In response to determining that the first viewing amount exceeds the second viewing amount, the media guidance application may recommend that supplemental video content be associated with the first media asset. For example, the media guidance application may suggest that a director's commentary clip be associated with "Forrest Gump" in response to the determination that "Forrest Gump" has a higher viewing amount than "Pulp Fiction."

The media guidance application may track a first movement amount to get the engagement in the media asset, but may also track a second movement amount for a first part or segment of the media asset and a third movement amount for a second part or segment of media asset. In this way, the media guidance application may determine how much of each segment the plurality of users viewed. For example, the first segment of "Forrest Gump" may be from the start of "Forrest Gump" to the thirtieth minute of "Forrest Gump" and the second portion of "Forrest Gump" may be from the thirtieth minute of "Forrest Gump" to the fortieth minute of "Forrest Gump." The media guidance application may determine that the first overlapping portion, which lasted from the tenth minute to the fifteenth minute, occurred during the first segment of "Forrest Gump." The media guidance application may compute a second movement amount of the first segment during which users were moving based on the first overlapping portion. For example, the media guidance application may determine that the second movement amount was 16.7%, as the media guidance application may determine that the only overlapping portion to occur during the first segment of "Forrest Gump" was the first overlapping portion, which was five minutes long out of the total length of the first segment of thirty minutes.

In some embodiments, the media guidance application may determine a second value that indicates how many of the plurality of users were moving for the entirety of a second overlapping portion occurring during the second segment. In some embodiments, the media guidance application may determine that the second value exceeds the threshold value and, based on this determination, compute a third movement amount of the second segment during which users were moving based on the second overlapping portion. For example, the media guidance application may determine that 28% of the plurality of users were moving between the thirty-second minute and the thirty-sixth minute of "Forrest Gump." The media guidance application may then determine that the second value, 28%, exceeds the threshold value of 25%, and, based on this determination, the media guidance application may compute the third movement amount. The media guidance application may determine that the third movement amount was 40%, based on the second overlapping portion being four minutes long out of a total length of the second segment of ten minutes.

In some embodiments, the media guidance application may infer a first viewing amount based on the second movement amount, the first viewing amount representing how much of the first segment was viewed by the first plurality of users. For example, the media guidance application may calculate the first viewing amount to be 83.3% of the first segment of "Forrest Gump," based on the first movement amount of 16.7%. The media guidance application may infer a second viewing amount based on the third movement amount, the second viewing amount representing how much of the second segment was viewed by the second plurality of users. For example, the media guidance application may calculate the second viewing amount to be 60% of the second segment of "Forrest Gump," based on the second movement amount of 40%.

In some embodiments, the media guidance application may compare the first viewing amount to the second viewing amount to determine that the first viewing amount is greater than the second viewing amount. In some embodiments, in response to the determination that the first viewing amount is greater than the second viewing amount, the media guidance application may recommend that supplemental video content be associated with the first segment of the media asset. For example, the media guidance application may determine that the first viewing amount, 83.3%, of the first segment of "Forrest Gump" is greater than the second viewing amount, 60%, of the second segment of "Forrest Gump." In response, the media guidance application may recommend that supplemental video content be associated with the first segment of the media asset.

In some embodiments, the media guidance application may automatically associate the supplemental video content with the first segment of the media asset. The media guidance application may automatically associate the supplemental video content with the first segment of the media asset by storing an association data structure identifying the first segment and the supplemental video content. For example, the database may be a database of supplemental content placement, and an association data structure may be stored therein. The association data structure may identify "Forrest Gump," identifying the media asset, "Start" and "30 minutes," identifying the first segment, and "Clip 1," identifying the supplemental content.

In some embodiments, the media guidance application may determine that the first segment is associated with a first characteristic and the second segment is associated with a second characteristic. Because certain characteristics may be more engaging (e.g., to a given user or to an aggregate or target audience), the media guidance application may associate supplemental video content with segments that contain that characteristic. For example, an action scene or a fight scene may keep audiences more engaged than a drama or exposition scene, so it may be advantageous to associate supplemental video content with fight scenes in general. As another example, the media guidance application may determine that the first segment of "Forrest Gump" is associated with the characteristic "Drama," and the second segment is associated with the characteristic "Humor." In some embodiments, because the first viewing amount for the first segment is higher than the second viewing amount for the second segment, the media guidance application may identify a second media asset comprising a third segment associated with the first characteristic. For example, the media guidance application may identify the third segment of "Pulp Fiction" from the tenth minute to the twentieth minute, and the media guidance application may determine that the third segment is associated with the characteristic "Drama." The media guidance application may recommend that the supplemental video content be associated with the third segment of the second media asset. For example, the media guidance application may suggest that a director's cut clip be associated with the third segment, the tenth to twentieth minute, of "Pulp Fiction."

It should be noted the systems and/or methods described above may be applied to, or used in accordance with, other systems, methods and/or apparatuses.

BRIEF DESCRIPTION OF THE DRAWINGS

The above and other objects and advantages of the disclosure will be apparent upon consideration of the following detailed description, taken in conjunction with the accompanying drawings, in which like reference characters refer to like parts throughout, and in which.

DETAILED DESCRIPTION

In some aspects of the disclosure, a media guidance application may receive movement logs from a plurality of user equipment containing information gathered from motion sensors corresponding to the plurality of user equipment. These movement logs may contain information indicating when each of the plurality of users moved while the user equipment was generating for display a media asset (i.e., a computer was displaying the movie "Forrest Gump"). For example, the movement log may indicate that a user moved from 6:35 PM to 6:45 PM, which, when compared to viewership data, may indicate that the user moved from the fifth minute to the fifteenth minute of the media asset. The movement logs may be analyzed to determine time periods during the media asset during which greater than a certain number of the plurality of users were moving. These time periods may in turn be used to infer how engaged the plurality of users were during the media asset, how much of the media asset the plurality of users viewed or paid attention to, or what portions of the media asset the plurality of users viewed.

In some aspects, the media guidance application (e.g., executed by control circuitry of a server) may determine that a plurality of user equipment corresponding to a plurality of users are generating for display a media asset. A first user of the plurality of users may correspond to a first user equipment, and a second user of the plurality of users may correspond to a second user equipment. The media guidance application may receive indications for requests for media from the plurality of user equipment, and may determine, based on the indications, that the plurality of user equipment are generating for display the media asset. As an illustrative example, the media guidance application may determine that an indication of the plurality of indications indicates that the first user requested, using a computer, to view "Forrest Gump" at 6:30 PM. Based on the indication, the media guidance application may determine that the computer is generating for display "Forrest Gump" at 6:30 PM.

Figure 1:
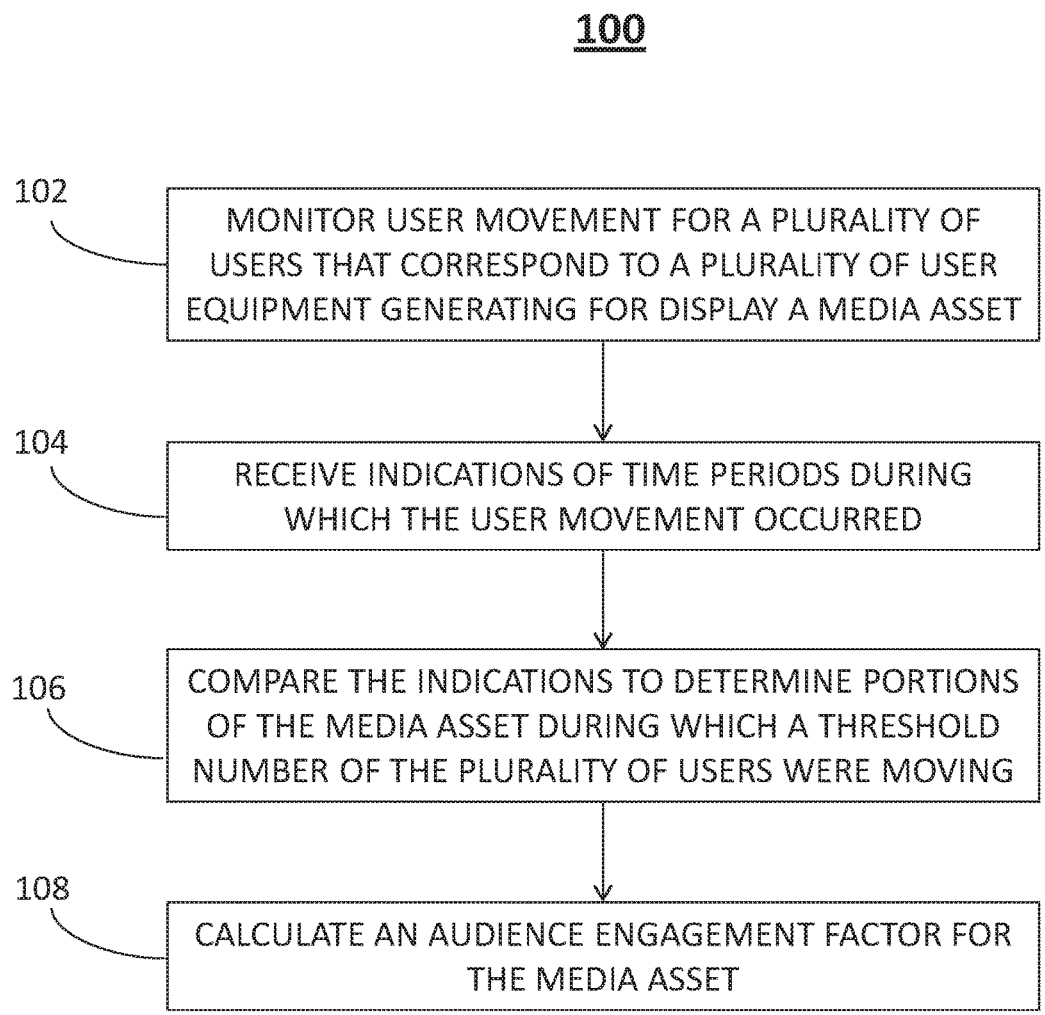
FIG. 1 is a flowchart of illustrative steps involved in determining audience engagement for a media asset based on user movement, in accordance with some embodiments of the disclosure.

FIG. 1 is a flowchart of illustrative steps involved in determining audience engagement for a media asset based on user movement, in accordance with some embodiments of the disclosure. Process 100 begins at 102, where the media guidance application may monitor user movement for a plurality of users that correspond to a plurality of user equipment generating for display a media asset. For example, the media guidance application may use motion sensors located in the homes of the plurality of users to determine during what time periods the users were moving. The media guidance application may create movement logs containing data structures indicating when the plurality of users were moving.

Process 100 continues to 104, where the media guidance application may receive indications of time periods during which the user movement occurred. For example, the media guidance application may receive data packets over the Internet that contain movement logs and viewership logs from the plurality of user equipment. Process 100 continues to 106, where the media guidance application may compare the indications to determine portions of the media asset during which a threshold number of the plurality of users were moving. The media guidance application may extract data structures from the movement logs and, based on the movement logs, determine when a user of the plurality of users moved. The media guidance application may further extract data structures from the viewership logs to determine when user equipment of the plurality of user equipment corresponding to the user of the plurality of users was generating for display the media asset. The media guidance application may compare the viewership logs and the movement logs to determine during what portions of the media asset the plurality of users were moving. The media guidance may determine, for each portion of the media asset, how many users of the plurality of users were moving by comparing the time of the portion of the media asset to the times of the portions of the media asset during which the plurality of users were moving.

Process 100 continues to 108, where the media guidance application may calculate an audience engagement factor for the media asset. For example, the media guidance application may determine a number of portions during which a threshold number of users were moving. The media guidance application may calculate a sum of the times of the number of portions during which a threshold number of users were moving to determine a total time of the media asset during which a threshold number of users were moving. The media guidance application may execute a function relating the total time to an audience engagement factor. The media guidance application may determine, by executing the function, the audience engagement factor for the media asset.

The amount of content available to users in any given content delivery system can be substantial. Consequently, many users desire a form of media guidance through an interface that allows users to efficiently navigate content selections and easily identify content that they may desire. An application that provides such guidance is referred to herein as an interactive media guidance application or, sometimes, a media guidance application or a guidance application.

Interactive media guidance applications may take various forms depending on the content for which they provide guidance. One typical type of media guidance application is an interactive television program guide. Interactive television program guides (sometimes referred to as electronic program guides) are well-known guidance applications that, among other things, allow users to navigate among and locate many types of content or media assets. Interactive media guidance applications may generate graphical user interface screens that enable a user to navigate among, locate and select content. As referred to herein, the terms "media asset" and "content" should be understood to mean an electronically consumable user asset, such as television programming, as well as pay-per-view programs, on-demand programs (as in video-on-demand (VOD) systems), Internet content (e.g., streaming content, downloadable content, Webcasts, etc.), video clips, audio, content information, pictures, rotating images, documents, playlists, websites, articles, books, electronic books, blogs, chat sessions, social media, applications, games, and/or any other media or multimedia and/or combination of the same. Guidance applications also allow users to navigate among and locate content. As referred to herein, the term "multimedia" should be understood to mean content that utilizes at least two different content forms described above, for example, text, audio, images, video, or interactivity content forms. Content may be recorded, played, displayed or accessed by user equipment devices, but can also be part of a live performance.

The media guidance application and/or any instructions for performing any of the embodiments discussed herein may be encoded on computer readable media. Computer readable media includes any media capable of storing data. The computer readable media may be transitory, including, but not limited to, propagating electrical or electromagnetic signals, or may be non-transitory including, but not limited to, volatile and non-volatile computer memory or storage devices such as a hard disk, floppy disk, USB drive, DVD, CD, media cards, register memory, processor caches, Random Access Memory ("RAM"), etc.

With the advent of the Internet, mobile computing, and high-speed wireless networks, users are accessing media on user equipment devices on which they traditionally did not. As referred to herein, the phrase "user equipment device," "user equipment," "user device," "electronic device," "electronic equipment," "media equipment device," or "media device" should be understood to mean any device for accessing the content described above, such as a television, a Smart TV, a set-top box, an integrated receiver decoder (IRD) for handling satellite television, a digital storage device, a digital media receiver (DMR), a digital media adapter (DMA), a streaming media device, a DVD player, a DVD recorder, a connected DVD, a local media server, a BLU-RAY player, a BLU-RAY recorder, a personal computer (PC), a laptop computer, a tablet computer, a WebTV box, a personal computer television (PC/TV), a PC media server, a PC media center, a hand-held computer, a stationary telephone, a personal digital assistant (PDA), a mobile telephone, a portable video player, a portable music player, a portable gaming machine, a smart phone, or any other television equipment, computing equipment, or wireless device, and/or combination of the same. In some embodiments, the user equipment device may have a front facing screen and a rear facing screen, multiple front screens, or multiple angled screens. In some embodiments, the user equipment device may have a front facing camera and/or a rear facing camera. On these user equipment devices, users may be able to navigate among and locate the same content available through a television. Consequently, media guidance may be available on these devices, as well. The guidance provided may be for content available only through a television, for content available only through one or more of other types of user equipment devices, or for content available both through a television and one or more of the other types of user equipment devices. The media guidance applications may be provided as on-line applications (i.e., provided on a web-site), or as stand-alone applications or clients on user equipment devices. Various devices and platforms that may implement media guidance applications are described in more detail below.

One of the functions of the media guidance application is to provide media guidance data to users. As referred to herein, the phrase "media guidance data" or "guidance data" should be understood to mean any data related to content or data used in operating the guidance application. For example, the guidance data may include program information, guidance application settings, user preferences, user profile information, media listings, media-related information (e.g., broadcast times, broadcast channels, titles, descriptions, ratings information (e.g., parental control ratings, critic's ratings, etc.), genre or category information, actor information, logo data for broadcasters' or providers' logos, etc.), media format (e.g., standard definition, high definition, 3D, etc.), on-demand information, blogs, websites, and any other type of guidance data that is helpful for a user to navigate among and locate desired content selections.

Figure 2:
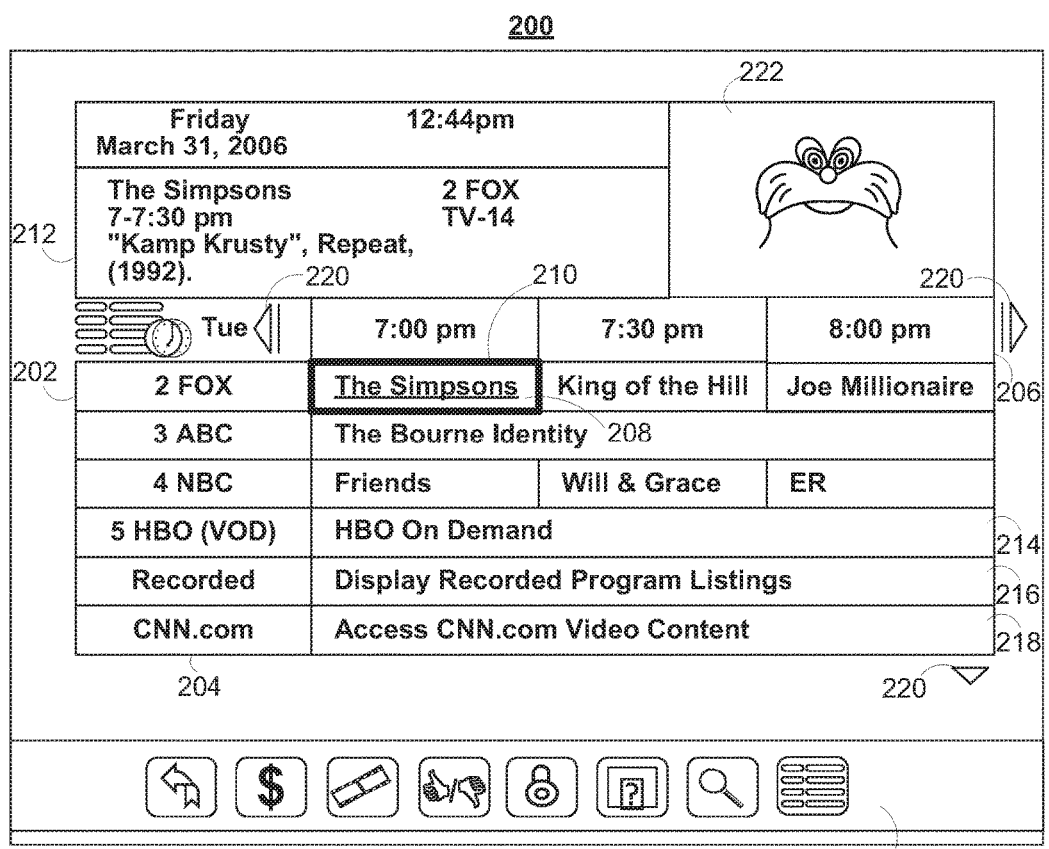
FIG. 2 shows an illustrative example of a display screen for use in accessing media content, in accordance with some embodiments of the disclosure.
Figure 3:
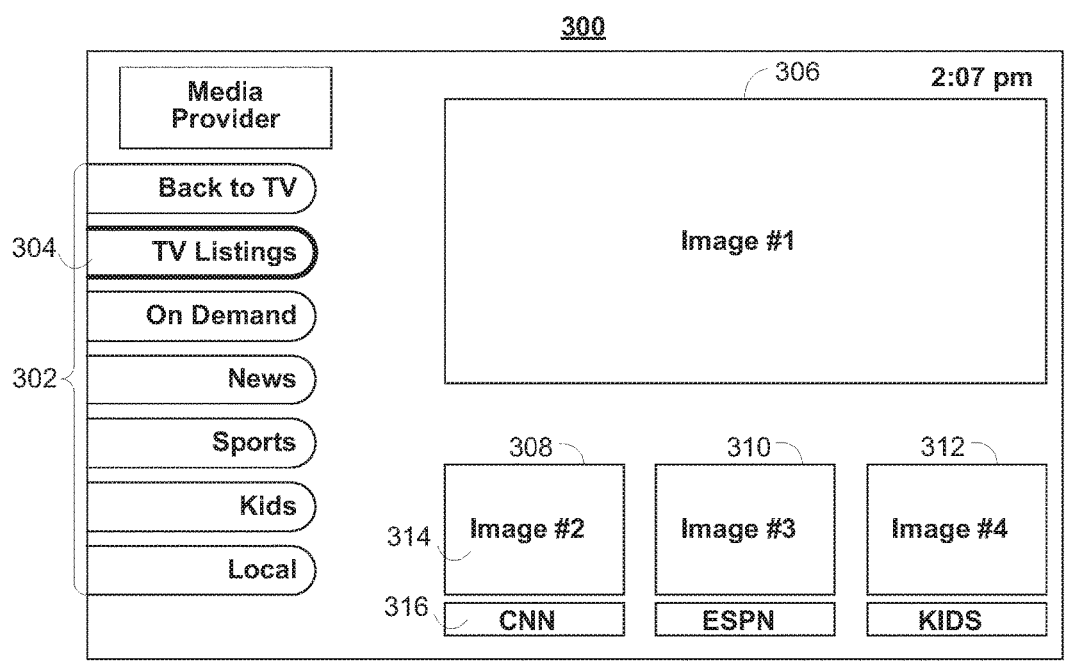
FIG. 3 shows another illustrative example of a display screen used in accessing media content, in accordance with some embodiments of the disclosure.

FIGS. 2-3 show illustrative display screens that may be used to provide media guidance data. The display screens shown in FIGS. 2-3 may be implemented on any suitable user equipment device or platform. While the displays of FIGS. 2-3 are illustrated as full screen displays, they may also be fully or partially overlaid over content being displayed. A user may indicate a desire to access content information by selecting a selectable option provided in a display screen (e.g., a menu option, a listings option, an icon, a hyperlink, etc.) or pressing a dedicated button (e.g., a GUIDE button) on a remote control or other user input interface or device. In response to the user's indication, the media guidance application may provide a display screen with media guidance data organized in one of several ways, such as by time and channel in a grid, by time, by channel, by source, by content type, by category (e.g., movies, sports, news, children, or other categories of programming), or other predefined, user-defined, or other organization criteria.

FIG. 2 shows illustrative grid of a program listings display 200 arranged by time and channel that also enables access to different types of content in a single display. Display 200 may include grid 202 with: (1) a column of channel/content type identifiers 204, where each channel/content type identifier (which is a cell in the column) identifies a different channel or content type available; and (2) a row of time identifiers 206, where each time identifier (which is a cell in the row) identifies a time block of programming. Grid 202 also includes cells of program listings, such as program listing 208, where each listing provides the title of the program provided on the listing's associated channel and time. With a user input device, a user can select program listings by moving highlight region 210. Information relating to the program listing selected by highlight region 210 may be provided in program information region 212. Region 212 may include, for example, the program title, the program description, the time the program is provided (if applicable), the channel the program is on (if applicable), the program's rating, and other desired information.

In addition to providing access to linear programming (e.g., content that is scheduled to be transmitted to a plurality of user equipment devices at a predetermined time and is provided according to a schedule), the media guidance application also provides access to non-linear programming (e.g., content accessible to a user equipment device at any time and is not provided according to a schedule). Non-linear programming may include content from different content sources including on-demand content (e.g., VOD), Internet content (e.g., streaming media, downloadable media, etc.), locally stored content (e.g., content stored on any user equipment device described above or other storage device), or other time-independent content. On-demand content may include movies or any other content provided by a particular content provider (e.g., HBO On Demand providing "The Sopranos" and "Curb Your Enthusiasm"). HBO ON DEMAND is a service mark owned by Time Warner Company L.P. et al. and THE SOPRANOS and CURB YOUR ENTHUSIASM are trademarks owned by the Home Box Office, Inc. Internet content may include web events, such as a chat session or Webcast, or content available on-demand as streaming content or downloadable content through an Internet web site or other Internet access (e.g. FTP).

Grid 202 may provide media guidance data for non-linear programming including on-demand listing 214, recorded content listing 216, and Internet content listing 218. A display combining media guidance data for content from different types of content sources is sometimes referred to as a "mixed-media" display. Various permutations of the types of media guidance data that may be displayed that are different than display 200 may be based on user selection or guidance application definition (e.g., a display of only recorded and broadcast listings, only on-demand and broadcast listings, etc.). As illustrated, listings 214, 216, and 218 are shown as spanning the entire time block displayed in grid 202 to indicate that selection of these listings may provide access to a display dedicated to on-demand listings, recorded listings, or Internet listings, respectively. In some embodiments, listings for these content types may be included directly in grid 202. Additional media guidance data may be displayed in response to the user selecting one of the navigational icons 220. (Pressing an arrow key on a user input device may affect the display in a similar manner as selecting navigational icons 220.)

Display 200 may also include video region 222, and options region 226. Video region 222 may allow the user to view and/or preview programs that are currently available, will be available, or were available to the user. The content of video region 222 may correspond to, or be independent from, one of the listings displayed in grid 202. Grid displays including a video region are sometimes referred to as picture-in-guide (PIG) displays. PIG displays and their functionalities are described in greater detail in Satterfield et al. U.S. Pat. No. 6,564,378, issued May 13, 2003 and Yuen et al. U.S. Pat. No. 6,239,794, issued May 29, 2001, which are hereby incorporated by reference herein in their entireties. PIG displays may be included in other media guidance application display screens of the embodiments described herein.

Options region 226 may allow the user to access different types of content, media guidance application displays, and/or media guidance application features. Options region 226 may be part of display 200 (and other display screens described herein), or may be invoked by a user by selecting an on-screen option or pressing a dedicated or assignable button on a user input device. The selectable options within options region 226 may concern features related to program listings in grid 202 or may include options available from a main menu display. Features related to program listings may include searching for other air times or ways of receiving a program, recording a program, enabling series recording of a program, setting program and/or channel as a favorite, purchasing a program, or other features. Options available from a main menu display may include search options, VOD options, parental control options, Internet options, cloud-based options, device synchronization options, second screen device options, options to access various types of media guidance data displays, options to subscribe to a premium service, options to edit a user's profile, options to access a browse overlay, or other options.

The media guidance application may be personalized based on a user's preferences. A personalized media guidance application allows a user to customize displays and features to create a personalized "experience" with the media guidance application. This personalized experience may be created by allowing a user to input these customizations and/or by the media guidance application monitoring user activity to determine various user preferences. Users may access their personalized guidance application by logging in or otherwise identifying themselves to the guidance application. Customization of the media guidance application may be made in accordance with a user profile. The customizations may include varying presentation schemes (e.g., color scheme of displays, font size of text, etc.), aspects of content listings displayed (e.g., only HDTV or only 3D programming, user-specified broadcast channels based on favorite channel selections, re-ordering the display of channels, recommended content, etc.), desired recording features (e.g., recording or series recordings for particular users, recording quality, etc.), parental control settings, customized presentation of Internet content (e.g., presentation of social media content, e-mail, electronically delivered articles, etc.) and other desired customizations.

The media guidance application may allow a user to provide user profile information or may automatically compile user profile information. The media guidance application may, for example, monitor the content the user accesses and/or other interactions the user may have with the guidance application. Additionally, the media guidance application may obtain all or part of other user profiles that are related to a particular user (e.g., from other web sites on the Internet the user accesses, such as www.allrovi.com, from other media guidance applications the user accesses, from other interactive applications the user accesses, from another user equipment device of the user, etc.), and/or obtain information about the user from other sources that the media guidance application may access. As a result, a user can be provided with a unified guidance application experience across the user's different user equipment devices. This type of user experience is described in greater detail below in connection with FIG. 5. Additional personalized media guidance application features are described in greater detail in Ellis et al., U.S. Patent Application Publication No. 2005/0251827, filed Jul. 11, 2005, Boyer et al., U.S. Pat. No. 7,165,098, issued Jan. 16, 2007, and Ellis et al., U.S. Patent Application Publication No. 2002/0174430, filed Feb. 21, 2002, which are hereby incorporated by reference herein in their entireties.

Another display arrangement for providing media guidance is shown in FIG. 3. Video mosaic display 300 includes selectable options 302 for content information organized based on content type, genre, and/or other organization criteria. In display 300, television listings option 304 is selected, thus providing listings 306, 308, 310, and 312 as broadcast program listings. In display 300 the listings may provide graphical images including cover art, still images from the content, video clip previews, live video from the content, or other types of content that indicate to a user the content being described by the media guidance data in the listing. Each of the graphical listings may also be accompanied by text to provide further information about the content associated with the listing. For example, listing 308 may include more than one portion, including media portion 314 and text portion 316. Media portion 314 and/or text portion 316 may be selectable to view content in full-screen or to view information related to the content displayed in media portion 314 (e.g., to view listings for the channel that the video is displayed on).

The listings in display 300 are of different sizes (i.e., listing 306 is larger than listings 308, 310, and 312), but if desired, all the listings may be the same size. Listings may be of different sizes or graphically accentuated to indicate degrees of interest to the user or to emphasize certain content, as desired by the content provider or based on user preferences. Various systems and methods for graphically accentuating content listings are discussed in, for example, Yates, U.S. Patent Application Publication No. 2010/0153885, filed Nov. 12, 2009, which is hereby incorporated by reference herein in its entirety.

Figure 4:
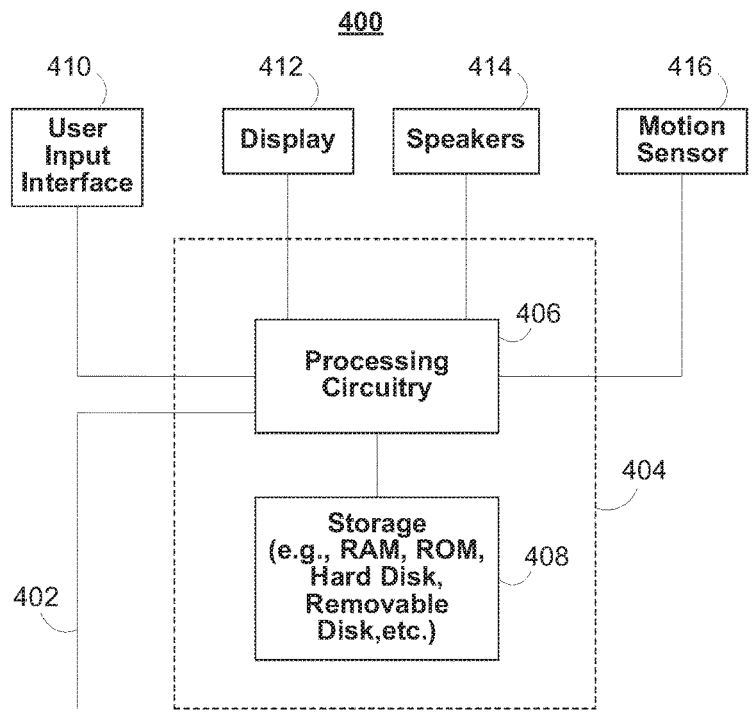
FIG. 4 is a block diagram of an illustrative user equipment device, in accordance with some embodiments of the disclosure.

Users may access content and the media guidance application (and its display screens described above and below) from one or more of their user equipment devices. FIG. 4 shows a generalized embodiment of illustrative user equipment device 400. More specific implementations of user equipment devices are discussed below in connection with FIG. 5. User equipment device 400 may receive content and data via input/output (hereinafter "I/O") path 402. I/O path 402 may provide content (e.g., broadcast programming, on-demand programming, Internet content, content available over a local area network (LAN) or wide area network (WAN), and/or other content) and data to control circuitry 404, which includes processing circuitry 406 and storage 408. Control circuitry 404 may be used to send and receive commands, requests, and other suitable data using I/O path 402. I/O path 402 may connect control circuitry 404 (and specifically processing circuitry 406) to one or more communications paths (described below). I/O functions may be provided by one or more of these communications paths, but are shown as a single path in FIG. 4 to avoid overcomplicating the drawing.

Control circuitry 404 may be based on any suitable processing circuitry such as processing circuitry 406. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer. In some embodiments, processing circuitry may be distributed across multiple separate processors or processing units, for example, multiple of the same type of processing units (e.g., two Intel Core i7 processors) or multiple different processors (e.g., an Intel Core i5 processor and an Intel Core i7 processor). In some embodiments, control circuitry 404 executes instructions for a media guidance application stored in memory (i.e., storage 408). Specifically, control circuitry 404 may be instructed by the media guidance application to perform the functions discussed above and below. For example, the media guidance application may provide instructions to control circuitry 404 to generate the media guidance displays. In some implementations, any action performed by control circuitry 404 may be based on instructions received from the media guidance application.

In client-server based embodiments, control circuitry 404 may include communications circuitry suitable for communicating with a guidance application server or other networks or servers. The instructions for carrying out the above mentioned functionality may be stored on the guidance application server. Communications circuitry may include a cable modem, an integrated services digital network (ISDN) modem, a digital subscriber line (DSL) modem, a telephone modem, Ethernet card, or a wireless modem for communications with other equipment, or any other suitable communications circuitry. Such communications may involve the Internet or any other suitable communications networks or paths (which is described in more detail in connection with FIG. 5). In addition, communications circuitry may include circuitry that enables peer-to-peer communication of user equipment devices, or communication of user equipment devices in locations remote from each other (described in more detail below).

Memory may be an electronic storage device provided as storage 408 that is part of control circuitry 404. As referred to herein, the phrase "electronic storage device" or "storage device" should be understood to mean any device for storing electronic data, computer software, or firmware, such as random-access memory, read-only memory, hard drives, optical drives, digital video disc (DVD) recorders, compact disc (CD) recorders, BLU-RAY disc (BD) recorders, BLU-RAY 3D disc recorders, digital video recorders (DVR, sometimes called a personal video recorder, or PVR), solid state devices, quantum storage devices, gaming consoles, gaming media, or any other suitable fixed or removable storage devices, and/or any combination of the same. Storage 408 may be used to store various types of content described herein as well as media guidance data described above. Nonvolatile memory may also be used (e.g., to launch a boot-up routine and other instructions). Cloud-based storage, described in relation to FIG. 5, may be used to supplement storage 408 or instead of storage 408.

Control circuitry 404 may include video generating circuitry and tuning circuitry, such as one or more analog tuners, one or more MPEG-2 decoders or other digital decoding circuitry, high-definition tuners, or any other suitable tuning or video circuits or combinations of such circuits. Encoding circuitry (e.g., for converting over-the-air, analog, or digital signals to MPEG signals for storage) may also be provided. Control circuitry 404 may also include scaler circuitry for upconverting and downconverting content into the preferred output format of the user equipment 400. Circuitry 404 may also include digital-to-analog converter circuitry and analog-to-digital converter circuitry for converting between digital and analog signals. The tuning and encoding circuitry may be used by the user equipment device to receive and to display, to play, or to record content. The tuning and encoding circuitry may also be used to receive guidance data. The circuitry described herein, including for example, the tuning, video generating, encoding, decoding, encrypting, decrypting, scaler, and analog/digital circuitry, may be implemented using software running on one or more general purpose or specialized processors. Multiple tuners may be provided to handle simultaneous tuning functions (e.g., watch and record functions, picture-in-picture (PIP) functions, multiple-tuner recording, etc.). If storage 408 is provided as a separate device from user equipment 400, the tuning and encoding circuitry (including multiple tuners) may be associated with storage 408.

A user may send instructions to control circuitry 404 using user input interface 410. User input interface 410 may be any suitable user interface, such as a remote control, mouse, trackball, keypad, keyboard, touch screen, touchpad, stylus input, joystick, voice recognition interface, or other user input interfaces. Display 412 may be provided as a stand-alone device or integrated with other elements of user equipment device 400. For example, display 412 may be a touchscreen or touch-sensitive display. In such circumstances, user input interface 410 may be integrated with or combined with display 412. Display 412 may be one or more of a monitor, a television, a liquid crystal display (LCD) for a mobile device, amorphous silicon display, low temperature poly silicon display, electronic ink display, electrophoretic display, active matrix display, electro-wetting display, electrofluidic display, cathode ray tube display, light-emitting diode display, electroluminescent display, plasma display panel, high-performance addressing display, thin-film transistor display, organic light-emitting diode display, surface-conduction electron-emitter display (SED), laser television, carbon nanotubes, quantum dot display, interferometric modulator display, or any other suitable equipment for displaying visual images. In some embodiments, display 412 may be HDTV-capable. In some embodiments, display 412 may be a 3D display, and the interactive media guidance application and any suitable content may be displayed in 3D. A video card or graphics card may generate the output to the display 412. The video card may offer various functions such as accelerated rendering of 3D scenes and 2D graphics, MPEG-2/MPEG-4 decoding, TV output, or the ability to connect multiple monitors. The video card may be any processing circuitry described above in relation to control circuitry 404. The video card may be integrated with the control circuitry 404. Speakers 414 may be provided as integrated with other elements of user equipment device 400 or may be stand-alone units. The audio component of videos and other content displayed on display 412 may be played through speakers 414. In some embodiments, the audio may be distributed to a receiver (not shown), which processes and outputs the audio via speakers 414.

In some embodiments, user equipment device 400 may include motion sensor 416. Motion sensor 416 may be provided as a stand-alone device or integrated with other elements of user equipment device 400. For example, motion sensor 416 may be integrated into display 412. In some embodiments, motion sensor 416 may be distinct and provided separately from user equipment device 400, and may be associated with the user equipment at some time subsequent to detecting motion. Motion sensor 416 may be one or more of a passive infrared motion sensor, a microwave motion sensor, an area reflective motion sensor, an ultrasonic motion sensor, a vibration motion sensor, wall mounted motion detectors, an accelerometer, a cell phone equipped with motion sensing equipment, wearable technology, video or camera systems, acoustic sensors, microphones, GPS, signal strength detectors, alarm system sensors, sensors in smart devices, door opening or closing sensors, or any other suitable equipment for sensing movement. User equipment device 400 may include more than one motion sensor, but a single motion sensor is shown in FIG. 4 to avoid overcomplicating the drawing.

The guidance application may be implemented using any suitable architecture. For example, it may be a stand-alone application wholly-implemented on user equipment device 400. In such an approach, instructions of the application are stored locally (e.g., in storage 408), and data for use by the application is downloaded on a periodic basis (e.g., from an out-of-band feed, from an Internet resource, or using another suitable approach). Control circuitry 404 may retrieve instructions of the application from storage 408 and process the instructions to generate any of the displays discussed herein. Based on the processed instructions, control circuitry 404 may determine what action to perform when input is received from input interface 410. For example, movement of a cursor on a display up/down may be indicated by the processed instructions when input interface 410 indicates that an up/down button was selected.

In some embodiments, the media guidance application is a client-server based application. Data for use by a thick or thin client implemented on user equipment device 400 is retrieved on-demand by issuing requests to a server remote to the user equipment device 400. In one example of a client-server based guidance application, control circuitry 404 runs a web browser that interprets web pages provided by a remote server. For example, the remote server may store the instructions for the application in a storage device. The remote server may process the stored instructions using circuitry (e.g., control circuitry 404) and generate the displays discussed above and below. The client device may receive the displays generated by the remote server and may display the content of the displays locally on equipment device 400. This way, the processing of the instructions is performed remotely by the server while the resulting displays are provided locally on equipment device 400. Equipment device 400 may receive inputs from the user via input interface 410 and transmit those inputs to the remote server for processing and generating the corresponding displays. For example, equipment device 400 may transmit a communication to the remote server indicating that an up/down button was selected via input interface 410. The remote server may process instructions in accordance with that input and generate a display of the application corresponding to the input (e.g., a display that moves a cursor up/down). The generated display is then transmitted to equipment device 400 for presentation to the user.

In some embodiments, the media guidance application is downloaded and interpreted or otherwise run by an interpreter or virtual machine (run by control circuitry 404). In some embodiments, the guidance application may be encoded in the ETV Binary Interchange Format (EBIF), received by control circuitry 404 as part of a suitable feed, and interpreted by a user agent running on control circuitry 404. For example, the guidance application may be an EBIF application. In some embodiments, the guidance application may be defined by a series of JAVA-based files that are received and run by a local virtual machine or other suitable middleware executed by control circuitry 404. In some of such embodiments (e.g., those employing MPEG-2 or other digital media encoding schemes), the guidance application may be, for example, encoded and transmitted in an MPEG-2 object carousel with the MPEG audio and video packets of a program.

Figure 5:
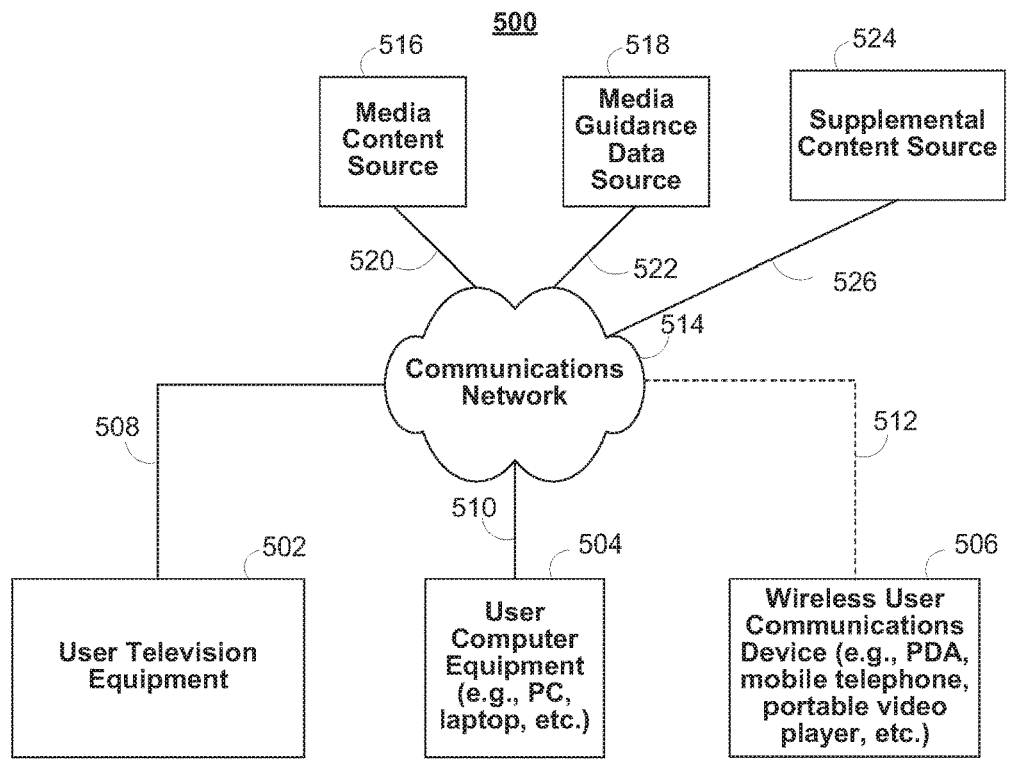
FIG. 5 is a block diagram of an illustrative media system, in accordance with some embodiments of the disclosure.

User equipment device 400 of FIG. 4 can be implemented in system 500 of FIG. 5 as user television equipment 502, user computer equipment 504, wireless user communications device 506, or any other type of user equipment suitable for accessing content, such as a non-portable gaming machine. For simplicity, these devices may be referred to herein collectively as user equipment or user equipment devices, and may be substantially similar to user equipment devices described above. User equipment devices, on which a media guidance application may be implemented, may function as a standalone device or may be part of a network of devices. Various network configurations of devices may be implemented and are discussed in more detail below.

A user equipment device utilizing at least some of the system features described above in connection with FIG. 4 may not be classified solely as user television equipment 502, user computer equipment 504, or a wireless user communications device 506. For example, user television equipment 502 may, like some user computer equipment 504, be Internet-enabled allowing for access to Internet content, while user computer equipment 504 may, like some television equipment 502, include a tuner allowing for access to television programming. The media guidance application may have the same layout on various different types of user equipment or may be tailored to the display capabilities of the user equipment. For example, on user computer equipment 504, the guidance application may be provided as a web site accessed by a web browser. In another example, the guidance application may be scaled down for wireless user communications devices 506.

In system 500, there is typically more than one of each type of user equipment device but only one of each is shown in FIG. 5 to avoid overcomplicating the drawing. In addition, each user may utilize more than one type of user equipment device and also more than one of each type of user equipment device.

In some embodiments, a user equipment device (e.g., user television equipment 502, user computer equipment 504, wireless user communications device 506) may be referred to as a "second screen device." For example, a second screen device may supplement content presented on a first user equipment device. The content presented on the second screen device may be any suitable content that supplements the content presented on the first device. In some embodiments, the second screen device provides an interface for adjusting settings and display preferences of the first device. In some embodiments, the second screen device is configured for interacting with other second screen devices or for interacting with a social network. The second screen device can be located in the same room as the first device, a different room from the first device but in the same house or building, or in a different building from the first device.

The user may also set various settings to maintain consistent media guidance application settings across in-home devices and remote devices. Settings include those described herein, as well as channel and program favorites, programming preferences that the guidance application utilizes to make programming recommendations, display preferences, and other desirable guidance settings. For example, if a user sets a channel as a favorite on, for example, the web site www.allrovi.com on their personal computer at their office, the same channel would appear as a favorite on the user's in-home devices (e.g., user television equipment and user computer equipment) as well as the user's mobile devices, if desired. Therefore, changes made on one user equipment device can change the guidance experience on another user equipment device, regardless of whether they are the same or a different type of user equipment device. In addition, the changes made may be based on settings input by a user, as well as user activity monitored by the guidance application.

The user equipment devices may be coupled to communications network 514. Namely, user television equipment 502, user computer equipment 504, and wireless user communications device 506 are coupled to communications network 514 via communications paths 508, 510, and 512, respectively. Communications network 514 may be one or more networks including the Internet, a mobile phone network, mobile voice or data network (e.g., a 4G or LTE network), cable network, public switched telephone network, or other types of communications network or combinations of communications networks. Paths 508, 510, and 512 may separately or together include one or more communications paths, such as, a satellite path, a fiber-optic path, a cable path, a path that supports Internet communications (e.g., IPTV), free-space connections (e.g., for broadcast or other wireless signals), or any other suitable wired or wireless communications path or combination of such paths. Path 512 is drawn with dotted lines to indicate that in the exemplary embodiment shown in FIG. 5 it is a wireless path and paths 508 and 510 are drawn as solid lines to indicate they are wired paths (although these paths may be wireless paths, if desired). Communications with the user equipment devices may be provided by one or more of these communications paths, but are shown as a single path in FIG. 5 to avoid overcomplicating the drawing.

Although communications paths are not drawn between user equipment devices, these devices may communicate directly with each other via communication paths, such as those described above in connection with paths 508, 510, and 512, as well as other short-range point-to-point communication paths, such as USB cables, IEEE 1394 cables, wireless paths (e.g., Bluetooth, infrared, IEEE 802-11x, etc.), or other short-range communication via wired or wireless paths. BLUETOOTH is a certification mark owned by Bluetooth SIG, INC. The user equipment devices may also communicate with each other directly through an indirect path via communications network 514.

System 500 includes content source 516 and media guidance data source 518 coupled to communications network 514 via communication paths 520 and 522, respectively. Paths 520 and 522 may include any of the communication paths described above in connection with paths 508, 510, and 512. Communications with the content source 516 and media guidance data source 518 may be exchanged over one or more communications paths, but are shown as a single path in FIG. 5 to avoid overcomplicating the drawing. In addition, there may be more than one of each of content source 516 and media guidance data source 518, but only one of each is shown in FIG. 5 to avoid overcomplicating the drawing. (The different types of each of these sources are discussed below.) If desired, content source 516 and media guidance data source 518 may be integrated as one source device. Although communications between sources 516 and 518 with user equipment devices 502, 504, and 506 are shown as through communications network 514, in some embodiments, sources 516 and 518 may communicate directly with user equipment devices 502, 504, and 506 via communication paths (not shown) such as those described above in connection with paths 508, 510, and 512.

System 500 may also include a supplemental content source 524 coupled to communications network 514 via a communications path 526. Path 526 may include any of the communication paths described above in connection with paths 508, 510, and 512. Supplemental content source 524 may be a stand-alone content source, or, if desired, supplemental content source 524 may be fully or partially integrated with content source 516, media guidance data source 518, or both, as one source device. Supplemental content source 524 may include supplemental content logic to determine which supplemental content or supplemental video content to transmit to specific users and under which circumstances. For example, a cable operator may have the right to insert supplemental video content during specific time slots on specific channels. Thus, supplemental content source 524 may transmit supplemental video content to users during those time slots. As another example, supplemental video content source 524 may target supplemental video content based on known user engagement during particular segments of various media assets. As yet another example, supplemental content source 524 may provide different supplemental content depending on the location of the user equipment viewing a media asset (e.g., east coast or west coast).

In some embodiments, supplemental content source 524 may be configured to maintain user information including viewing amounts or engagement scores for various media assets in order to deliver supplemental video content during media assets that are particularly engaging. Additionally or alternatively, a server associated with supplemental content source 524 may be configured to store raw information that may be used to infer how much of a media asset was viewed by a plurality of users. In some embodiments, supplemental content source 524 may transmit a request to another device for the raw information and infer how much of a media asset was viewed by a plurality of users based on the raw information. Supplemental content source 524 may recommend supplemental content or associated supplemental video content with an appropriate media asset based on inferring how much of the media asset was viewed by a plurality of users.

Content source 516 may include one or more types of content distribution equipment including a television distribution facility, cable system headend, satellite distribution facility, programming sources (e.g., television broadcasters, such as NBC, ABC, HBO, etc.), intermediate distribution facilities and/or servers, Internet providers, on-demand media servers, and other content providers. NBC is a trademark owned by the National Broadcasting Company, Inc., ABC is a trademark owned by the American Broadcasting Company, Inc., and HBO is a trademark owned by the Home Box Office, Inc. Content source 516 may be the originator of content (e.g., a television broadcaster, a Webcast provider, etc.) or may not be the originator of content (e.g., an on-demand content provider, an Internet provider of content of broadcast programs for downloading, etc.). Content source 516 may include cable sources, satellite providers, on-demand providers, Internet providers, over-the-top content providers, or other providers of content. Content source 516 may also include a remote media server used to store different types of content (including video content selected by a user), in a location remote from any of the user equipment devices. Systems and methods for remote storage of content, and providing remotely stored content to user equipment are discussed in greater detail in connection with Ellis et al., U.S. Pat. No. 7,761,892, issued Jul. 20, 2010, which is hereby incorporated by reference herein in its entirety.

Media guidance data source 518 may provide media guidance data, such as the media guidance data described above. Media guidance data may be provided to the user equipment devices using any suitable approach. In some embodiments, the guidance application may be a stand-alone interactive television program guide that receives program guide data via a data feed (e.g., a continuous feed or trickle feed). Program schedule data and other guidance data may be provided to the user equipment on a television channel sideband, using an in-band digital signal, using an out-of-band digital signal, or by any other suitable data transmission technique. Program schedule data and other media guidance data may be provided to user equipment on multiple analog or digital television channels.

In some embodiments, guidance data from media guidance data source 518 may be provided to users' equipment using a client-server approach. For example, a user equipment device may pull media guidance data from a server, or a server may push media guidance data to a user equipment device. In some embodiments, a guidance application client residing on the user's equipment may initiate sessions with source 518 to obtain guidance data when needed, e.g., when the guidance data is out of date or when the user equipment device receives a request from the user to receive data. Media guidance may be provided to the user equipment with any suitable frequency (e.g., continuously, daily, a user-specified period of time, a system-specified period of time, in response to a request from user equipment, etc.). Media guidance data source 518 may provide user equipment devices 502, 504, and 506 the media guidance application itself or software updates for the media guidance application.

In some embodiments, the media guidance data may include viewer data. For example, the viewer data may include current and/or historical user activity information (e.g., what content the user typically watches, what times of day the user watches content, whether the user interacts with a social network, at what times the user interacts with a social network to post information, what types of content the user typically watches (e.g., pay TV or free TV), mood, brain activity information, etc.). The media guidance data may also include subscription data. For example, the subscription data may identify to which sources or services a given user subscribes and/or to which sources or services the given user has previously subscribed but later terminated access (e.g., whether the user subscribes to premium channels, whether the user has added a premium level of services, whether the user has increased Internet speed). In some embodiments, the viewer data and/or the subscription data may identify patterns of a given user for a period of more than one year. The media guidance data may include a model (e.g., a survivor model) used for generating a score that indicates a likelihood a given user will terminate access to a service/source. For example, the media guidance application may process the viewer data with the subscription data using the model to generate a value or score that indicates a likelihood of whether the given user will terminate access to a particular service or source. In particular, a higher score may indicate a higher level of confidence that the user will terminate access to a particular service or source. Based on the score, the media guidance application may generate promotions that entice the user to keep the particular service or source indicated by the score as one to which the user will likely terminate access.

Media guidance applications may be, for example, standalone applications implemented on user equipment devices. For example, the media guidance application may be implemented as software or a set of executable instructions which may be stored in storage 408, and executed by control circuitry 404 of a user equipment device 400. In some embodiments, media guidance applications may be client-server applications where only a client application resides on the user equipment device, and server application resides on a remote server. For example, media guidance applications may be implemented partially as a client application on control circuitry 404 of user equipment device 400 and partially on a remote server as a server application (e.g., media guidance data source 518) running on control circuitry of the remote server. When executed by control circuitry of the remote server (such as media guidance data source 518), the media guidance application may instruct the control circuitry to generate the guidance application displays and transmit the generated displays to the user equipment devices. The server application may instruct the control circuitry of the media guidance data source 518 to transmit data for storage on the user equipment. The client application may instruct control circuitry of the receiving user equipment to generate the guidance application displays.

Content and/or media guidance data delivered to user equipment devices 502, 504, and 506 may be over-the-top (OTT) content. OTT content delivery allows Internet-enabled user devices, including any user equipment device described above, to receive content that is transferred over the Internet, including any content described above, in addition to content received over cable or satellite connections. OTT content is delivered via an Internet connection provided by an Internet service provider (ISP), but a third party distributes the content. The ISP may not be responsible for the viewing abilities, copyrights, or redistribution of the content, and may only transfer IP packets provided by the OTT content provider. Examples of OTT content providers include YOUTUBE, NETFLIX, and HULU, which provide audio and video via IP packets. Youtube is a trademark owned by Google Inc., Netflix is a trademark owned by Netflix Inc., and Hulu is a trademark owned by Hulu, LLC. OTT content providers may additionally or alternatively provide media guidance data described above. In addition to content and/or media guidance data, providers of OTT content can distribute media guidance applications (e.g., web-based applications or cloud-based applications), or the content can be displayed by media guidance applications stored on the user equipment device.

Media guidance system 500 is intended to illustrate a number of approaches, or network configurations, by which user equipment devices and sources of content and guidance data may communicate with each other for the purpose of accessing content and providing media guidance. The embodiments described herein may be applied in any one or a subset of these approaches, or in a system employing other approaches for delivering content and providing media guidance. The following four approaches provide specific illustrations of the generalized example of FIG. 5.

In one approach, user equipment devices may communicate with each other within a home network. User equipment devices can communicate with each other directly via short-range point-to-point communication schemes described above, via indirect paths through a hub or other similar device provided on a home network, or via communications network 514. Each of the multiple individuals in a single home may operate different user equipment devices on the home network. As a result, it may be desirable for various media guidance information or settings to be communicated between the different user equipment devices. For example, it may be desirable for users to maintain consistent media guidance application settings on different user equipment devices within a home network, as described in greater detail in Ellis et al., U.S. Patent Publication No. 2005/0251827, filed Jul. 11, 2005. Different types of user equipment devices in a home network may also communicate with each other to transmit content. For example, a user may transmit content from user computer equipment to a portable video player or portable music player.

In a second approach, users may have multiple types of user equipment by which they access content and obtain media guidance. For example, some users may have home networks that are accessed by in-home and mobile devices. Users may control in-home devices via a media guidance application implemented on a remote device. For example, users may access an online media guidance application on a website via a personal computer at their office, or a mobile device such as a PDA or web-enabled mobile telephone. The user may set various settings (e.g., recordings, reminders, or other settings) on the online guidance application to control the user's in-home equipment. The online guide may control the user's equipment directly, or by communicating with a media guidance application on the user's in-home equipment. Various systems and methods for user equipment devices communicating, where the user equipment devices are in locations remote from each other, is discussed in, for example, Ellis et al., U.S. Pat. No. 8,046,801, issued Oct. 25, 2011, which is hereby incorporated by reference herein in its entirety.

In a third approach, users of user equipment devices inside and outside a home can use their media guidance application to communicate directly with content source 516 to access content. Specifically, within a home, users of user television equipment 502 and user computer equipment 504 may access the media guidance application to navigate among and locate desirable content. Users may also access the media guidance application outside of the home using wireless user communications devices 506 to navigate among and locate desirable content.

In a fourth approach, user equipment devices may operate in a cloud computing environment to access cloud services. In a cloud computing environment, various types of computing services for content sharing, storage or distribution (e.g., video sharing sites or social networking sites) are provided by a collection of network-accessible computing and storage resources, referred to as "the cloud." For example, the cloud can include a collection of server computing devices, which may be located centrally or at distributed locations, that provide cloud-based services to various types of users and devices connected via a network such as the Internet via communications network 514. These cloud resources may include one or more content sources 516 and one or more media guidance data sources 518. In addition or in the alternative, the remote computing sites may include other user equipment devices, such as user television equipment 502, user computer equipment 504, and wireless user communications device 506. For example, the other user equipment devices may provide access to a stored copy of a video or a streamed video. In such embodiments, user equipment devices may operate in a peer-to-peer manner without communicating with a central server.

The cloud provides access to services, such as content storage, content sharing, or social networking services, among other examples, as well as access to any content described above, for user equipment devices. Services can be provided in the cloud through cloud computing service providers, or through other providers of online services. For example, the cloud-based services can include a content storage service, a content sharing site, a social networking site, or other services via which user-sourced content is distributed for viewing by others on connected devices. These cloud-based services may allow a user equipment device to store content to the cloud and to receive content from the cloud rather than storing content locally and accessing locally-stored content.

A user may use various content capture devices, such as camcorders, digital cameras with video mode, audio recorders, mobile phones, and handheld computing devices, to record content. The user can upload content to a content storage service on the cloud either directly, for example, from user computer equipment 504 or wireless user communications device 506 having content capture feature. Alternatively, the user can first transfer the content to a user equipment device, such as user computer equipment 504. The user equipment device storing the content uploads the content to the cloud using a data transmission service on communications network 514. In some embodiments, the user equipment device itself is a cloud resource, and other user equipment devices can access the content directly from the user equipment device on which the user stored the content.

Cloud resources may be accessed by a user equipment device using, for example, a web browser, a media guidance application, a desktop application, a mobile application, and/or any combination of access applications of the same. The user equipment device may be a cloud client that relies on cloud computing for application delivery, or the user equipment device may have some functionality without access to cloud resources. For example, some applications running on the user equipment device may be cloud applications, i.e., applications delivered as a service over the Internet, while other applications may be stored and run on the user equipment device. In some embodiments, a user device may receive content from multiple cloud resources simultaneously. For example, a user device can stream audio from one cloud resource while downloading content from a second cloud resource. Or a user device can download content from multiple cloud resources for more efficient downloading. In some embodiments, user equipment devices can use cloud resources for processing operations such as the processing operations performed by processing circuitry described in relation to FIG. 4.

As referred herein, the term "in response to" refers to initiated as a result of. For example, a first action being performed in response to a second action may include interstitial steps between the first action and the second action. As referred herein, the term "directly in response to" refers to caused by. For example, a first action being performed directly in response to a second action may not include interstitial steps between the first action and the second action.

Figure 6:
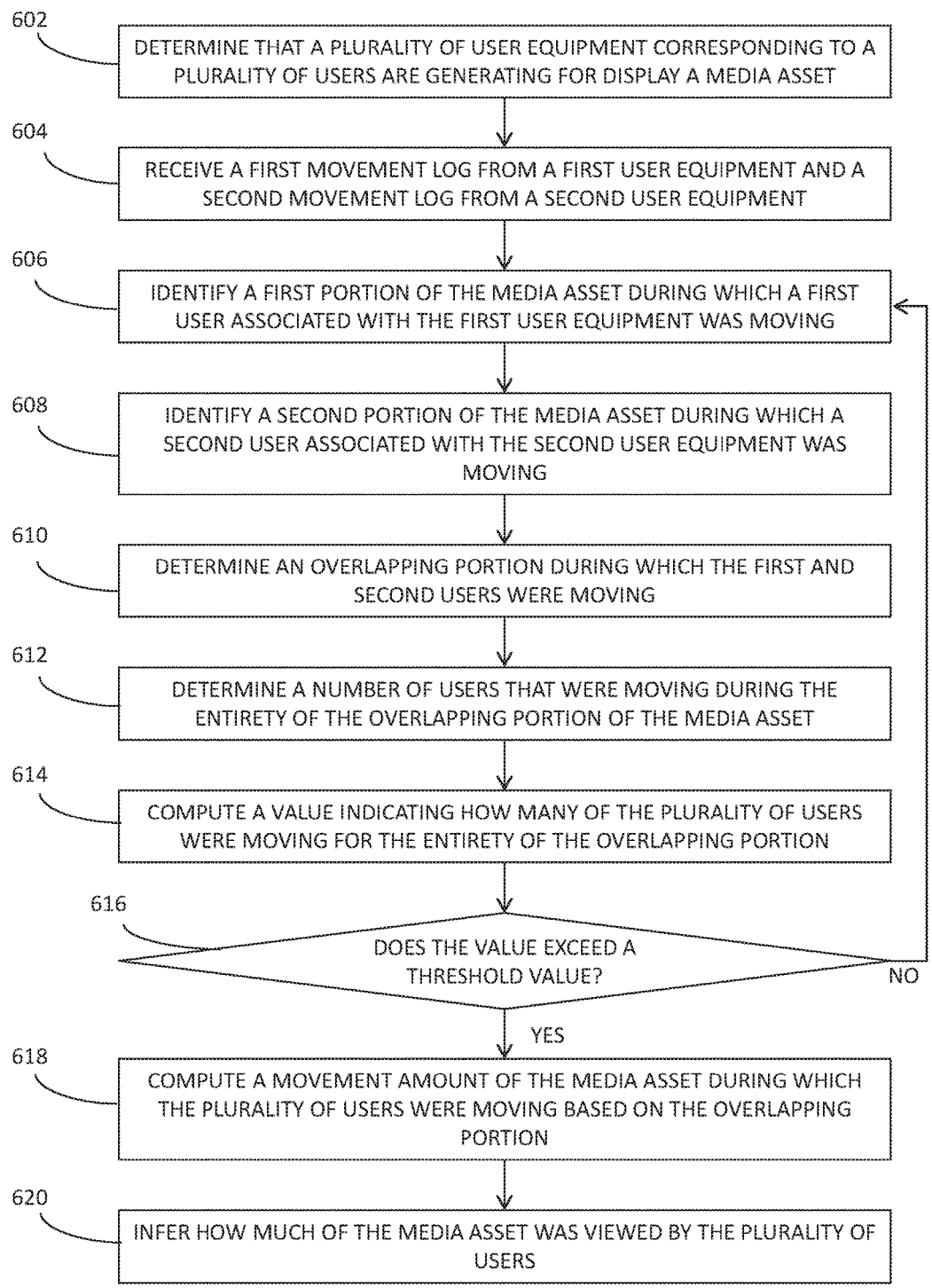
FIG. 6 is a flowchart of illustrative steps for measuring audience engagement based on user motion, in accordance with some embodiments of the disclosure.

FIG. 6 is a flowchart of illustrative steps for measuring audience engagement based on user motion, in accordance with some embodiments of the disclosure. For example, a media guidance application may instruct control circuitry 404 to execute the elements of process 600.

Process 600 begins at 602, where the media guidance application determines (e.g., via control circuitry 404) that a plurality of user equipment (e.g., user equipment 502, 504, and 506) corresponding to a plurality of users are generating for display (e.g., on display 412) a media asset. In some embodiments, the media guidance application may determine that a plurality of user equipment are generating for display a media asset by receiving (e.g., via control circuitry 404 from user equipment 502, 504, and 506) data pertaining to media generated for display at the user equipment.

In some embodiments, the media guidance application may receive (e.g., via control circuitry 404) data pertaining to media generated for display at the user equipment by receiving (e.g., via control circuitry 404) indications of requests for media from the plurality of user equipment. As used herein, an "indication of a request for media" is defined to mean a signal that originates from user input, the user input causing media to be displayed. In some embodiments, an indication of a request for media may be a signal that indicates a command for a source of media to be changed, where the signal may originate from, e.g., a user pressing a "channel up" button on a remote control. The signal may be a data packet containing, for example, any or all of a field including an identifier for the source change (e.g., changing the channel to channel 3) at the user equipment, a field including an identifier for a time of the request (e.g., 6:30 PM) from user equipment, and a field including an identifier (e.g., a user equipment ID) of the user equipment from which the data packet was received.

In other embodiments, an indication of a request for media may be a signal that commands that a media asset be displayed, where the signal may originate from, e.g., a user selecting a media asset with a link or in an on-demand menu. The signal may be a data packet containing, for example, any or all of a field including an identifier for a media asset requested at the user device (e.g., the movie "Forrest Gump"), a field including an identifier for a time of the request (e.g., 6:30 PM), a field including an identifier for the starting point in the media asset (e.g., starting at the fifth minute of "Forrest Gump"), and a field including an identifier (e.g., a user equipment ID) of the user equipment from which the data packet is received. In some embodiments, the media guidance application may receive (e.g., via control circuitry 404), from user equipment, indications of requests for media at the time the corresponding requests are made in order to provide continual updates of the status of the user equipment.

The media guidance application may determine (e.g., via control circuitry 404), based on the indications of requests for media, that the user equipment is generating for display the media asset. In some embodiments, the media guidance application may determine that a user equipment of the plurality of user equipment is generating for display the media asset by determining that in an indication of a request for media, the field including an identifier for a media asset requested at the user equipment contains an identifier (e.g., the title) for the media asset (e.g., "Forrest Gump") and that the field including an identifier for a time of the request contains an identifier of a first time (e.g., 6:30 PM). Because the media guidance application determines that the indication of a request for media indicates that a user requested to view the media asset at the time of the request by, e.g., detecting a selection by a user of the media asset through an on-demand menu or through an Internet page, the media guidance application will determine that the user equipment generated the media asset for display at the time of the request.

In some embodiments, the media guidance application may determine that a user equipment of the plurality of user equipment is generating for display the media asset by determining that in a first indication of a request for media, the field including an identifier for a source change at the user equipment contains an identifier of a first channel (e.g., channel 3), and the field including an identifier for a time of the request contains an identifier of a first time (e.g., 6:30). The media guidance application may retrieve (e.g., from media guidance data source 518 over communications network 514) a presentation data table correlating a plurality of sources and a plurality of display times to a plurality of media assets. The media guidance application may determine, by comparing information in the fields of the data packet to corresponding information in the presentation data table, that the user equipment is generating for display the media asset (e.g., on display 412). More details on how the media guidance application determines, by comparing information in the fields of the data packet to corresponding information in the presentation data table, that a user equipment is generating for display the media asset are presented in relation to FIG. 7 below.

In some embodiments, the media guidance application may receive (e.g., via control circuitry 404) data pertaining to media generated for display at the user equipment by receiving (e.g., via control circuitry 404), from a user equipment, a signal that informs the media guidance application of what is being generated for display by the user equipment. In some embodiments, the media guidance application may receive (e.g., via control circuitry 404) the signal continuously (e.g., streamed) or periodically from the user equipment to provide continual updates on the media asset being generated for display by the user equipment. The media guidance application may determine what is being generated for display on the user equipment based on the periodic or continuous updates.

In other embodiments, the media guidance application may receive data pertaining to media generated for display at the user equipment by receiving (e.g., via control circuitry 404 from media guidance data source 518 over communications network 514) historical data from a user profile describing what media was being generated for displayed by the user equipment associated with the user profile. For example, the historical data may describe what the user equipment was generating for display at various times or how the user may have interacted with the user equipment. The media guidance application may determine (e.g., via control circuitry 404), based on the historical data, when various media was being generated for display by the user equipment.

Process 600 continues to 604, where the media guidance application receives (e.g., via control circuitry 404), a first movement log from a first user equipment (e.g., user equipment 502, 504, and 506) and a second movement log from a second user equipment (e.g., user equipment 502, 504, and 506). The first user equipment and the second user equipment may be part of the plurality of user equipment as described in 602.

As used herein, a "movement log" is defined to mean a data structure that describes movement events associated with one or more users as detected using a motion sensor (e.g., motion sensor 416) or a plurality of motion sensors associated with the user equipment of the user. As used herein, a "movement event" is defined to mean a detected movement of a user. The movement may be a single, discrete movement (e.g., a brief wave of a hand) or a continuous or nearly continuous movement (e.g., the user walked across a room over the span of five seconds). For example, a movement log may contain information identifying any or all of a unique motion sensor ID (e.g., a serial code of the motion sensor), a start time of a movement event (e.g., 6:30 PM), an end time of a movement event (e.g., 6:40 PM), a duration of the movement event (e.g., 10 minutes), and a measure of the motion in space of the movement event. For example, the measure of the motion in space of the movement event may be any or all of the length of the movement (e.g., the user moved five feet), the speed of the movement event (e.g., a user moved an arm at five miles per hour), the direction of a movement event (e.g., north, east, up, toward a motion sensor, perpendicular to a motion sensor, etc.), acceleration of a movement event (e.g., the user stood up suddenly), and whether the user was moving (e.g., a user moving during a one-second period may be represented by a one and a user not moving during a one second period may be represented by a 0).

In some embodiments, the media guidance application may determine (e.g., via control circuitry 404) a movement intensity for a movement event. As used herein, a "movement intensity" is defined to mean an indication of how intense, how perceptible, or how large the movement event was, or how likely the movement event was to disengage the user from the program. In some embodiments, the movement intensity may be any of the measures of the motion in space of the movement event described above, and thus the media guidance application may determine the movement intensity of a movement event by accessing the measure of the motion in space of the movement event. In other embodiments, the movement intensity may be a measure of proximity of a user to the user equipment. If the user is close to the user equipment, they are more likely to be engaged with the program. However, if the user is further away from the user equipment, they are more likely to be disengaged with the program. The media guidance may determine the proximity of the user to the user equipment using the measure of the motion in space of the movement event.

In some embodiments, the media guidance application may determine a movement intensity for a movement event using the measure of motion in space for a movement event. For example, the media guidance application may determine a movement intensity by receiving a movement log from a user equipment associated with a camera. The media guidance application may further retrieve (e.g., from media guidance data source 518) a table that corresponds characteristics of the measure of motion in space to movement intensities. For example, the media guidance application may access the measure of motion in space for a movement event to determine that the movement event was nominal movement, e.g., a flick of the wrist, a slight shift in position, or scratching one's head, and by comparing the nominal movement to the corresponding data in the table, determine that the measure of motion in space is below a threshold movement and that the movement intensity is 0. The media guidance application may determine that other movement events indicate that the user stood up, walked across the room, or left the room, each of which indicate an increased likelihood that a user was not engaged with the media asset. A user standing up may only indicate that the user was disengaged for a short amount of time, as the movement is simple and requires little focus from the user. On the other hand, a user walking far across the room will likely not be engaged with the program while doing walking, as the user's vision is directed away from the user equipment for a long period of time, and instead is used to navigate and traverse the room to whatever destination the user has chosen in the room. Finally, a user who has left the room is likely to be completely disengaged from the media asset, as the user likely cannot view the media asset, and at best may only be able to hear the media asset. By comparing these measures of motion in space to the corresponding data in the table, the media guidance application may determine that the measures of motion in space are above a first, second, and third thresholds, respectively, the thresholds representing an increased likelihood that the user was disengaged from the media asset. Thus, the media guidance application may thus determine that the movement intensities are 1, 2, and 3 respectively.

As another illustrative example of how the media guidance application may determine a movement intensity for a movement event using the measure of motion in space for a movement event, the media guidance application may determine a movement intensity by receiving a movement log from a user equipment associated with an accelerometer. The media guidance application may further determine (e.g., from media guidance data source 518) by accessing the measure of motion in space for a movement event and a start time of the movement event that the user accelerated his or her arm upwards at 6:30 PM at 2 ft/s$^2$. This simple motion may indicate, e.g., that the user answered his or her cell phone. However, while the user may not be as engaged with the media asset, the user is likely still viewing it, meaning he or she is more engaged than, say, navigating the room or leaving the room. The media guidance application may compare these characteristics to a corresponding field in a retrieved data table (e.g., from media guidance data source 518) that corresponds characteristics of the measure of motion in space to movement intensities to determine that the movement intensity was, for example, 1 for that movement event.

As an illustrative example of how the media guidance application may determine a movement intensity for a movement event by determining the proximity of the user to the user equipment, the media guidance application may determine a movement intensity by receiving a movement log from a user equipment associated with a camera and a sensor in a smart refrigerator. The media guidance application may further determine (e.g., from media guidance data source 518) by accessing the measure of motion in space for a movement event detected by the camera and a start time of the movement event that the user walked away from the TV for 10 seconds, and was not in the room for 5 minutes. The media guidance (e.g., from media guidance data source 518) may further determine that the user went to the kitchen by accessing the measure of motion in space for a movement event detected by the smart refrigerator and a start time of the movement event that the user opened the refrigerator door during the 5 minutes the user was not in the room. Thus, the media guidance application may determine that the user went into the next room (the kitchen) and was away from the user equipment for five minutes, and was thus disengaged from the media asset. The media guidance application may compare these characteristics to a corresponding field in a retrieved data table (e.g., from media guidance data source 518) that corresponds characteristics of the measure of motion in space to movement intensities to determine that the movement intensity was, for example, 3 for that movement event, or another relatively high movement intensity. More details on how the media guidance application determines the proximity of the user to the user equipment are presented in relation to FIG. 14 below.

In some embodiments, the media guidance application may associate (e.g., via control circuitry 404) a motion sensor (e.g., motion sensor 416) or a plurality of motion sensors that detects the movement events in the movement log with the user equipment (e.g., user equipment 502, 504, and 506) from which the movement log is received. For example, the media guidance application may store data that indicates a relationship between the motion sensor and the user equipment, for example, by storing a data structure with any or all of a field identifying a unique motion sensor ID and a field identifying a unique user equipment ID.

The media guidance application may associate (e.g., via control circuitry 404) a motion sensor (e.g., motion sensor 416) that detects the movement events in the movement log with the user equipment from which the movement log is received by comparing product registration or subscriber information for the user equipment to information of the motion sensor. For example, if product registration information indicates that the user equipment and the motion sensor are both registered to "John Doe," then this may be evidence that the motion sensor and the user equipment should be associated with each other. The media guidance application may associate a motion sensor with the user equipment by comparing a network address of the motion sensor and the network address of the user equipment to determine if the network addresses of the user equipment and motion sensor match. For example, if the motion sensor and the user equipment are both connected to the same WiFi (and thus have the same network address) at the same time, then the motion sensor data may be relevant to determining whether a user was engaged with the media asset, and thus, that the media guidance application should associate the user equipment and motion sensor. Finally, the media guidance application may associate the motion sensor with the user equipment if the motion sensor and the user equipment are within a threshold distance from each other (e.g., within five feet of each other). If a motion sensor is very close to the user equipment, this may indicate, again, that the motion sensor data gathered from the motion sensor may be relevant to determining whether the user was engaged with the media asset, and that the media guidance application should associate the motion sensor and the user equipment.

Because multiple motion sensors may be associated with the same user equipment, the media guidance application may determine which of the motion sensors, or which plurality of the motion sensors, are collecting data regarding movement events that correspond to users within a perceivable range of the user equipment generating for display the media asset. For example, data from a motion sensor in a different room from the user equipment may not provide useful information in determining whether the user associated with the user equipment is engaged with the programming. In some embodiments, the media guidance application may determine (e.g., via control circuitry 404) that a motion sensor (e.g., motion sensor 416) corresponds to user equipment (e.g., user equipment 502, 504, and 506) by receiving (e.g., via control circuitry 404) a movement log from each of a plurality of motion sensors. The media guidance application may extract from each movement log the unique motion sensor ID of the respective motion sensor to create (e.g., via control circuitry 404) a data structure including a list of motion sensor IDs of the plurality of motion sensors. In some embodiments, the media guidance application (e.g., via control circuitry 404) may further receive (e.g., via control circuitry 404) data pertaining to media generated for display at the user equipment, such as an indication of a request for media.

To determine (e.g., via control circuitry 404) that the motion sensor (e.g., motion sensor 416) corresponds to user equipment (e.g., user equipment 502, 504, and 506), the media guidance application may further compare (e.g., via control circuitry 404) a start time and an end time of a movement event in a movement log to an indication of a request for media. If the media guidance application determines (e.g., via control circuitry 404), by comparing the time of the indication of the request for media to the start and end time, that no movement event of the movement log corresponds to an indication of the request for media, the media guidance application may remove the motion sensor ID corresponding to that movement log from the list of motion sensor IDs. The media guidance application may continue to compare (e.g., via control circuitry 404) the start times and end times of the plurality of movement events of each respective movement log to the time of a plurality of requests for media to progressively eliminate motion sensor IDs from the list until only a single motion sensor ID remains in the list. In response, the media guidance application may associate (e.g., via control circuitry 404) the motion sensor with the remaining motion sensor ID with the user equipment.

Process 600 continues to 606, where the media guidance application identifies (e.g., via control circuitry 404) a first portion of the media asset (e.g., "Forrest Gump") during which a first user associated with the first user equipment was moving. As used herein, "a portion of a media asset" describes a time period during display of the media asset (e.g., the fifth to the tenth minute of the display of the media asset). In some embodiments, a portion of a media asset may include any time period during which supplemental content was displayed immediately prior to, during, or immediately after the display of the media asset. In this manner, movement events occurring during supplemental video content may be captured when determining audience engagement for the media asset. In other embodiments, a portion of the media asset may not include any time period during which supplemental video content was displayed. The media guidance application may determine (e.g., via control circuitry 404) when supplemental video content is displayed based on data pertaining to media generated for display at user equipment, including, for example, metadata identifying when supplemental video content is inserted between segments of the media asset. The media guidance application may not include in any portion of the media asset times during which supplemental video content was displayed, and thus prevent movement events occurring during the display of supplemental video content from being included when determining audience engagement.

In some embodiments, the first movement log may only indicate a start time in relation to a time zone (e.g., 6:35 PM EST) and not in relation to the display of the media asset (e.g., the fifth minute of the display of the media asset). The media guidance application may therefore have to correlate the first movement log with the data pertaining to media generated for display at the first user equipment to determine the first portion of the media asset.

The media guidance application may correlate the first movement log with data pertaining to media generated for display at the first user equipment by determining (e.g., via control circuitry 404) that the first user moved from 6:35 PM to 6:45 PM by extracting the start time and end time of a movement event in the first movement log. The media guidance application may further determine, by extracting from an indication of a request for media the time of the indication, that the first user equipment (e.g., user equipment 502, 504, and 506) began generating for display (e.g., on display 412) the media asset at 6:30 PM at the beginning of the media asset. The media guidance application may determine, by subtracting the time of the indication from the start and end time of the movement event, the time of the movement event relative to the display of the media asset, and in doing so correlate the first movement log with the data pertaining to media generated for display at the first user equipment. For example, the media guidance application may determine that the first portion of the media asset during which the first user moved was from the fifth to the fifteenth minute of the media asset.

In some embodiments, the media guidance application identifies (e.g., via control circuitry 404) a first portion of the media asset (e.g., "Forrest Gump") during which a first user was moving based on a plurality of movement events. For example, a first movement event may last from 6:35 PM to 6:38 PM, a second movement event may last from 6:38 PM to 6:40 PM, and a third movement event may last from 6:40 PM to 6:45 PM. The media guidance application may determine the first portion by determining that the end time of the first movement event is within a threshold time of the start time of the second movement event (e.g., 30 seconds) and that the end time of the second movement event is within a threshold time of the start time of the third movement event. Because the first, second, and third movement events are within threshold times of one another, the media guidance application may determine that the start time of the first movement event is the start time of the first portion and the end time of the third movement event is the end time of the first portion, and thereby describes the first portion using all three movement events.

In some embodiments, the media guidance application identifies (e.g., via control circuitry 404) a first portion of the media asset (e.g., "Forrest Gump") during which a first user was moving based on the movement intensities contained in the first movement log. For example, in order to determine the first portion, the media guidance application may determine (e.g., via control circuitry 404) that a single movement event makes up the first portion, as described above. In response, the media guidance application may determine that the movement intensity associated with the first portion may be the movement intensity of the movement event by extracting the movement intensity of the movement event from the first movement log. The media guidance application may further determine whether the movement intensity of the first portion exceeds a threshold movement intensity. The media guidance application may retrieve the threshold movement intensity from a server (e.g., media guidance data source 518) or the threshold movement intensity may have been set by a system administrator, or may be set by user input (e.g., through user input interface 410). The media guidance application may only determine that the first user was moving during the first portion if the movement intensity associated with the first portion is above the threshold movement intensity. If the movement intensity is below the threshold movement intensity, the media guidance application may determine a new first portion of the media asset based on the first movement log. In this way, the media guidance application may not include movement events when inferring how much of the media asset was viewed by the plurality of users or when calculating the viewing amount if the movement events represent negligible movement.

In some embodiments, the media guidance application identifies (e.g., via control circuitry 404) a first portion of the media asset (e.g., "Forrest Gump") during which a first user was moving based on the movement intensities contained in the first movement log. In the case where the first portion of the media asset is made up of more than one movement event, e.g., the first, second, and third movement events as described above, the media guidance application may determine an aggregated movement intensity associated with the first portion. As used herein, an "aggregated movement intensity associated with a portion" is defined to mean a metric representing a combination of movement intensities for a plurality of movement events occurring during the portion. For example, to determine the aggregated movement intensity of the first portion, the media guidance application may determine (e.g., via control circuitry 404), by extracting the movement intensities from the movement log, that the first movement event is associated with a movement intensity of 5, the second movement event is associated with a movement intensity of 3, and the third movement event is associated with a movement intensity of 7. The media guidance application may calculate (e.g., via control circuitry 404) a weighted combination of the movement intensities of the first, second, and third movement events to determine that the aggregated movement intensity for the first portion is 5. Similarly, as discussed above, the media guidance application may only determine (e.g., via control circuitry 404) that the first user was moving during the first portion if the aggregated movement intensity associated with the first portion is above the threshold movement intensity.

In some embodiments, the media guidance application identifies (e.g., via control circuitry 404) a first portion of the media asset during which a first user was moving by comparing a movement event in the first movement log corresponding to the first portion with typical characteristics of the first user's movement. The media guidance application may determine typical characteristics of the first user's movement by storing (e.g., in storage 408) a plurality of movement logs for the first user occurring during the display of a plurality of media assets. The media guidance application may extract, from the stored plurality of movement logs for the first user, a plurality of movement events in order to determine the typical characteristics of the first user's movements for the plurality of movement events. For example, the media guidance application may determine that the user moved his or her arms frequently during the plurality of media assets. The media guidance may compare a movement event of the first movement log with the determined typical characteristics of the first user's movement to determine whether the movement event is similar to any of the determined typical characteristics. The media guidance application may only determine (e.g., via control circuitry 404) that the first user was moving during the first portion if the media guidance application determines that the movement event corresponding to the first portion is not similar to any of the typical characteristics of the first user's movement.

Process 600 continues to 608, where the media guidance application identifies (e.g., via control circuitry 404) a second portion of the media asset (e.g., "Forrest Gump") during which a second user associated with the second user equipment was moving. This may be done in a similar manner as was done for the first movement log in 606 of process 600. For example, the media guidance application may determine when the second user moved (e.g., via control circuitry 404) by extracting the start time and duration of a movement event from the second movement log, and may determine that the second user moved from 8:40 PM to 8:50 PM. The media guidance application may determine, by extracting historical data pertaining to media generated for display at the user equipment, that the second user equipment (e.g., user equipment 502, 504, and 506) was generating for display the tenth to twentieth minute of the media asset from 8:40 to 8:50 through an Internet page or on-demand. The media guidance application may correlate (e.g., via control circuitry 404) the movement event from 8:40 PM to 8:50 PM with the historical data to determine that the second portion of the media asset during which the second user was moving is from the tenth minute to the twentieth minute of the media asset.

Process 600 continues to 610, where the media guidance application determines (e.g., via control circuitry 404) an overlapping portion of the media asset (e.g., "Forrest Gump") during which both the first and second users were moving. As used herein, an "overlapping portion" is defined to mean a period of time during the media asset during which two or more users were moving, e.g., a portion that is fully contained within the first and the second portion.

In some embodiments, the media guidance application may determine the overlapping portion by comparing the start and end times of the first portion to the start and end times of second portion. For example, the media guidance application may compare (e.g., via control circuitry 404) the start time (e.g., the fifth minute of the media asset) of the first portion to the start time (e.g., the tenth minute) and the end time (e.g., the fifteenth minute) of the second portion to determine that the start time of the first portion is before the start time the second portion. The media guidance application may further compare the end time (e.g., the fifteenth minute) of the first portion to the start time and the end time of the second portion to determine that the end time of the first portion is between the start time and the end time of the second portion. The media guidance application may then determine that the start time of the overlapping portion is the start time of the second portion (e.g., the tenth minute) and that the end time of the overlapping portion is the end time of the first portion (e.g., the fifteenth minute) based on the comparisons. More details on how the media guidance application determines the overlapping portion by comparing the start times and end times of the first and second portions are presented in relation to FIG. 9 below.

In other embodiments, the media guidance application may determine an overlapping portion during which the first and second users were moving by determining (e.g., via control circuitry 404) for each increment (e.g., one minute) of the media asset whether the respective increment is contained in the first portion and the second portion. In some embodiments, the media guidance application may determine (e.g., via control circuitry 404) whether each increment is in the overlapping portion by determining whether the time of the increment is between the start times and the end times of the first and second portions. For example, the eleventh minute is between the start time (e.g., fifth minute) and the end time (e.g., the fifteenth minute) of the first portion and between the start time (e.g., the tenth minute) and the end time (e.g., the twentieth minute) of the second portion, and is therefore contained in both the first and second portion and is part of the overlapping portion. All increments may be analyzed in this manner to determine that the tenth, eleventh, twelfth, thirteenth, and fourteenth minutes are contained in both the first and second portions, and therefore represent the overlapping portion starting at the tenth minute and ending at the fifteenth minute.

Process 600 continues to 612, where the media guidance application determines (e.g., via control circuitry 404) a number of users that were moving during the entirety of the overlapping portion of the media asset. In some embodiments, the media guidance application may determine the number of users that were moving during the entirety of the overlapping portion by receiving (e.g., via control circuitry 404) additional movement logs from the plurality of user equipment (e.g., user equipment 502, 504, and 506). In some embodiments, the media guidance application may receive multiple movement logs from at least a portion of the plurality of user equipment. For example, the media guidance application may receive a third movement log from the first user equipment comprising a data structure representing a plurality of movement events of a third user. In some embodiments, the media guidance application may detect (e.g., via control circuitry 404) the plurality of movement events in the third movement log using the same motion sensor as was used to detect the plurality of movement events in the first movement log. In other embodiments, the media guidance application may detect the third movement log using a different motion sensor (e.g., the first and second users are each wearing an accelerometer) as was used to detect the plurality of movement events in the first movement log.

In some embodiments, after receiving the additional movement logs and in order to determine that a user of the plurality of users associated with an additional movement log was moving for the entirety of the overlapping portion, the media guidance application may extract (e.g., via control circuitry 404), from the additional movement log, the start times and the end times of a plurality of movement events. In some embodiments, to determine if the user was moving for the entirety of the overlapping portion, the media guidance application may compare (e.g., via control circuitry 404) the start time of each movement event of the additional movement log to the start time of the overlapping portion, and may compare the end time of each the movement event of the additional movement log to the end time of the overlapping portion. If the media guidance application determines that the start time (e.g., the ninth minute of the media asset) of a movement event is before the start time (e.g., the tenth minute) of the overlapping portion and the end time (e.g., the seventeenth minute) of a movement event is after the end time (e.g., the fifteenth minute) of the overlapping portion, that is, that the movement event encompasses the overlapping portion, then the media guidance application may determine that the user was moving for the entirety of the overlapping portion. The media guidance application may then repeat this process for every additional movement log to determine the number of users who were moving for the entirety of the overlapping portion.

In some embodiments, to determine the number of users who were moving for the entirety of the overlapping portion, the media guidance application may (e.g., via control circuitry 404) increment a counter for each user the media guidance application determines (e.g., via control circuitry 404) moved for the entirety of the overlapping portion of the media asset as described above. The counter may be used to keep track of the total number of users that were moving for the entirety of the overlapping portion in the already analyzed additional movement logs as the media guidance application continues to analyze additional movement logs for movement events that encompass the entirety of the overlapping portion. For example, the media guidance application, after determining the overlapping portion as described in relation to 610 of process 600, may create a counter variable starting with the value 2 (to represent the first and second user moving for the entirety of the overlapping portion) and store the counter in a memory (e.g., in storage 408). Every time the media guidance application determines that a user moved for the entirety of the overlapping portion, the counter's value may be increased by one until all the additional movement logs are analyzed and a number of users who were moving for the entirety of the overlapping portion is determined, e.g., is equal to the final value of the counter.

Process 600 continues to 614, where the media guidance application computes (e.g., via control circuitry 404) a value indicating how many of the plurality of users were moving for the entirety of the overlapping portion. For example, to determine the value indicating how many of the plurality of users were moving for the entirety of the overlapping portion, the media guidance application may compute (e.g., via control circuitry 404) a percentage of the plurality of users that were moving for the entirety of the overlapping portion.

For example, to compute the percentage, the media guidance application may retrieve (e.g., from storage 408) the counter, determined as described above in 612 of process 600. The media guidance application may also determine, for example, by determining the length of a list of the additional movement logs received, that the total number of movement logs that the media guidance application received and analyzed a total of 98 additional movement logs from the plurality of user equipment (e.g., user equipment 502, 504, and 506). The media guidance application may determine (e.g., via control circuitry 404) that 100 users, including the first and second users, correspond to user equipment generating for display the media asset because of the 98 received additional movement logs and the first and second movement logs. The media guidance application may then determine that the value indicating how many of the plurality of users were moving for the entirety of the overlapping portion is 30% by computing a quotient of the number of users who were moving for the entirety of the overlapping portion and the total number of users corresponding to user equipment generating for display the media asset.

Process 600 continues to 616, where the media guidance application determines (e.g., via control circuitry 404) if the value exceeds a threshold value. Because at least one user is likely moving at any given point in the media asset, determining if greater than a threshold value were moving will ensure that the overlapping portion is significant for determining how much of the program users were engaged with. For example, if 100% of users were moving during a portion of the media asset, that portion is likely a very disengaging portion of the media asset and thus it is likely that very few people were watching the media asset during that portion. If 1% of people were moving during another portion of a media asset, then the vast majority of people were viewing the media asset, and it may not be advantageous to use that portion to represent that people did not view the program during that time. The threshold value may therefore be something in between: for example, the threshold value may be 25%. If 25% of users were moving during a portion of the media asset, that may be enough to indicate that that portion was substantially disengaging. In some embodiments, the media guidance application may determine the threshold value by calculating (e.g., via control circuitry 404) an average and a statistical variation of a plurality of values indicating how many of a plurality of users were moving for the entirety of a plurality of overlapping portions for a plurality of media assets. In this way, the media guidance application may determine at what threshold value a significant number of users were moving.

In some embodiments, to determine whether the value exceeds the threshold value, the media guidance application may retrieve (e.g., via control circuitry 404) the threshold value from a server (e.g., from media guidance data source 518 over communications network 514) or local storage (e.g., storage 408), receive the threshold value from a database (e.g., media guidance data source 518 over communications network 514), receive the threshold value from a system administrator (e.g., over communications network 514), receive a user input of the threshold value (e.g., via user input interface 410), or any other suitable method for receiving or retrieving the threshold value.

In some embodiments, to determine the threshold value, the media guidance application may retrieve or receive (e.g., via control circuitry 404 from media guidance data source 518 over communications network 514) a function to determine the threshold value, and the media guidance application may execute (e.g., via control circuitry 404) the function to determine the threshold value. For example, the media guidance application may input multiple variables into the function to determine the threshold value. Input variables to determine the threshold value may be movement intensities, popularity of the show, etc.

In some embodiments, the media guidance application may use characteristics of the movement event to determine the threshold value. For example, the media guidance application may retrieve from a database (e.g., from media guidance data source 518 over communications network 514) a data table relating the characteristics of a movement event to determine whether the movement event indicates that the user was engaged or disengaged with the media asset. In some embodiments, the media guidance application may select the table based on the media asset, such that movement events can be analyzed in the context of the media being displayed. For example, the media guidance application may determine based on the data table that a user jumping up (e.g., a movement intensity of 2) may mean engagement in a football game, but may alternatively indicate disengagement in a romantic comedy. In other embodiments, the media guidance application may retrieve a standardized table for all media assets to determine whether the movement event indicates that the user was engaged or disengaged with the media asset. For example, the media guidance application may determine that a user raising his arm to his ear represents disengagement in the program. The media guidance application may determine that the threshold value is relatively high if the plurality of movement events for the plurality of users were on average movements that indicate engagement and may determine that the threshold value is relatively low if the plurality of movement events for the plurality of users were on average movements that indicate disengagement.

If the media guidance application determines (e.g., via control circuitry 404) that the value does not exceed the threshold value, process 600 continues to 606 and 608, where the media guidance application may identify a third portion during which the first user was moving, and a fourth portion of the media asset during which the second user was moving. The third portion may be the same as the first portion, or the fourth portion may be the same as the second portion, but not both. This is to ensure that a new pair of portions for the first and second users is being analyzed.

If the media guidance application determines (e.g., via control circuitry 404) that the value exceeds the threshold value, process 600 continues to 618, where the media guidance application computes (e.g., via control circuitry 404) a movement amount of the media asset during which the plurality of users were moving based on the overlapping portion. As used herein, a "movement amount" is a metric representing how much of a media asset, or a portion thereof, a plurality of users were moving. For example, it may be determined that greater than a threshold number of the plurality of users were moving for 50% of the program, so the movement amount may be 50%. Because user movement may represent that a user is not engaged with the program, the movement amount may be a good metric to determine for how much of a media asset, or portion thereof, users were engaged. The media guidance application may determine the movement amount by determining the total duration of the media asset during which over a threshold number of users were moving, and divide that by the total length of the media asset (e.g., 240 minutes).

In some embodiments, the media guidance application may determine (e.g., via control circuitry 404) the total duration of the media asset during which over a threshold number of users were moving by summing the duration of a plurality of overlapping portions, removing the duration of the overlapping portions that themselves overlap. In some embodiments, the media guidance application may determine (e.g., via control circuitry 404) that there is only one overlapping portion, as described above. For example, the media guidance application may determine that the only overlapping portion is from the fifth minute to the fifteenth minute. The media guidance application may determine (e.g., via control circuitry 404) that the movement amount is 2.08% by dividing the total duration of the overlapping portions by the total length of the media asset of 240 minutes.

In some embodiments, the media guidance application may determine additional movement logs to calculate the movement amount. In some embodiments, the media guidance application may repeat (e.g., via control circuitry 404) 606 to 616 of process 600 for the first and second movement logs to determine additional overlapping portions in order to calculate the movement amount. In some embodiments, the media guidance application may repeat steps 604 to 606 with different movement logs (e.g., a third movement log and a fourth movement log or the first movement log and a fifth movement log) to determine additional overlapping portions. In some embodiments, the media guidance application may store (e.g., in storage 408 and at media guidance data source 518) the additional overlapping portions and the overlapping portion in a data structure of overlapping portions identifying the start time and the end time of each overlapping portion. In some embodiments, the media guidance application may retrieve (e.g., via control circuitry 404 from media guidance data source 518 and storage 408) the data structure of overlapping portions.

In some embodiments, the media guidance application (e.g., via control circuitry 404) may determine the total duration of the media asset during which over a threshold number of users were moving by summing the duration of a plurality of overlapping portions, removing the duration of the overlapping portions that themselves overlap. In some embodiments, the media guidance application may determine (e.g., via control circuitry 404) the total duration of the media asset during which over a threshold number of users were moving by determining that none of the plurality of overlapping portions themselves overlap. The media guidance application may do so by comparing the start time and end time of each of the plurality of overlapping portions to the start time and end time of each other of the start times and end times of the plurality of overlapping portions to determine that the start time nor the end time of each of the plurality of overlapping portions fall between a start time or end time of another overlapping portion. The media guidance application may then determine (e.g., via control circuitry 404) the total duration of the media asset during which over a threshold number of users were moving as a sum of the durations of the overlapping portions.

In some embodiments, the media guidance application may determine (e.g., via control circuitry 404) the total duration of the media asset during which over a threshold number of users were moving by determining (e.g., via control circuitry 404) that a first overlapping portion and a second overlapping portion of the plurality of overlapping portions themselves overlap. In response, the media guidance application may create (e.g., via control circuitry 404) and store (e.g., in storage 408), in the data structure of overlapping portions, a new overlapping portion in a similar manner to how a single overlapping portion is created from a first and second portion, as discussed in 610 of process 600. The media guidance application may delete (e.g., via control circuitry 404) the first and second overlapping portions from the data structure of overlapping portions (e.g., storage 408) such that the first and second overlapping portions are removed from the calculation of the total duration of the media asset during which over a threshold number of users were moving. After this process is completed for all overlapping portions which themselves overlap, the media guidance application may then determine (e.g., via control circuitry 404) the total duration of the media asset during which over a threshold number of users were moving as a sum of the remaining overlapping portions in the data structure of overlapping portions.

Process 600 continues to 620, where the media guidance application infers (e.g., via control circuitry 404) how much of the media asset was viewed by the plurality of users. In some embodiments, the media guidance application may compute (e.g., via control circuitry 404) a viewing amount to determine how much of the media asset was viewed by the plurality of users. As used herein, a "viewing amount" is a metric representing how much of a media asset, or a portion thereof, was viewed by the plurality of users. The viewing amount may additionally represent how engaged the users were in the media asset. The media guidance application may infer the viewing amount by retrieving (e.g., from media guidance data source 518) a function relating the movement amount to the viewing amount and inputting the movement amount into the function to determine the viewing amount. Additional details for this calculation can be found below in the discussion of FIG. 11. In some embodiments, the media guidance may proceed to store the inference (e.g., in storage 408 and media guidance data source 518). In some embodiments, the media guidance may proceed to generate for display (e.g., on display 412) an indication of the inference.

In some embodiments, the media guidance application may include additional data in inferring how much of the media asset was viewed by the plurality of users. The media guidance application may use the additional data to further refine the inference. In some embodiments, the media guidance application may include (e.g., via control circuitry 404) the number of movement events in the inference or in the calculation of the viewing amount. If a user moves many times, then this may mean that the user is less engaged in the program. For example, the media guidance application may determine (e.g., via control circuitry 404), by determining the total number of movement events for the plurality of users in the first movement log, the second movement log, and the plurality of movement logs, a value representing the number of movement events. For example, the value representing the number of movement events may be the total number of movement events, the total number of movement events per, e.g., second, minute, or hour of the media asset, the total number of movement events during the media asset for the plurality of users, the number of movement events per the total number of movement logs received, or any other suitable metric or combination thereof. The media guidance application may then infer how much of the media asset was viewed by the plurality of users based on the value representing the number of movement events for the plurality of users. For example, the value representing the number of movement events for the plurality of users may be an input in a function used to calculate a viewing amount.

In some embodiments, the media guidance application may include (e.g., via control circuitry 404) biometric data in inferring how much of the media asset was viewed by a plurality of users. Examples of biometric data for a user include gyroscopic movement, gyroscopic movement volatility, duration between gyroscopic movement events, heart rate, heart rate acceleration or deceleration, heart rate relative to the user's normal asleep, at-rest, active, or strenuous heart rates, duration between heart rate changes, respiratory rate, respiratory rate acceleration or deceleration, respiratory rate relative to the user's normal asleep, at-rest, active, or strenuous respiratory rates, duration between respiratory rate changes, or any other suitable biometric data or combination thereof. The media guidance application may use this data, for example, as inputs into the function to determine the viewing amount from the movement amount. More details on how the media guidance application includes biometric data in inferring how much of the media asset was viewed by a plurality of users are presented in relation to FIG. 11 below.

Figure 7:
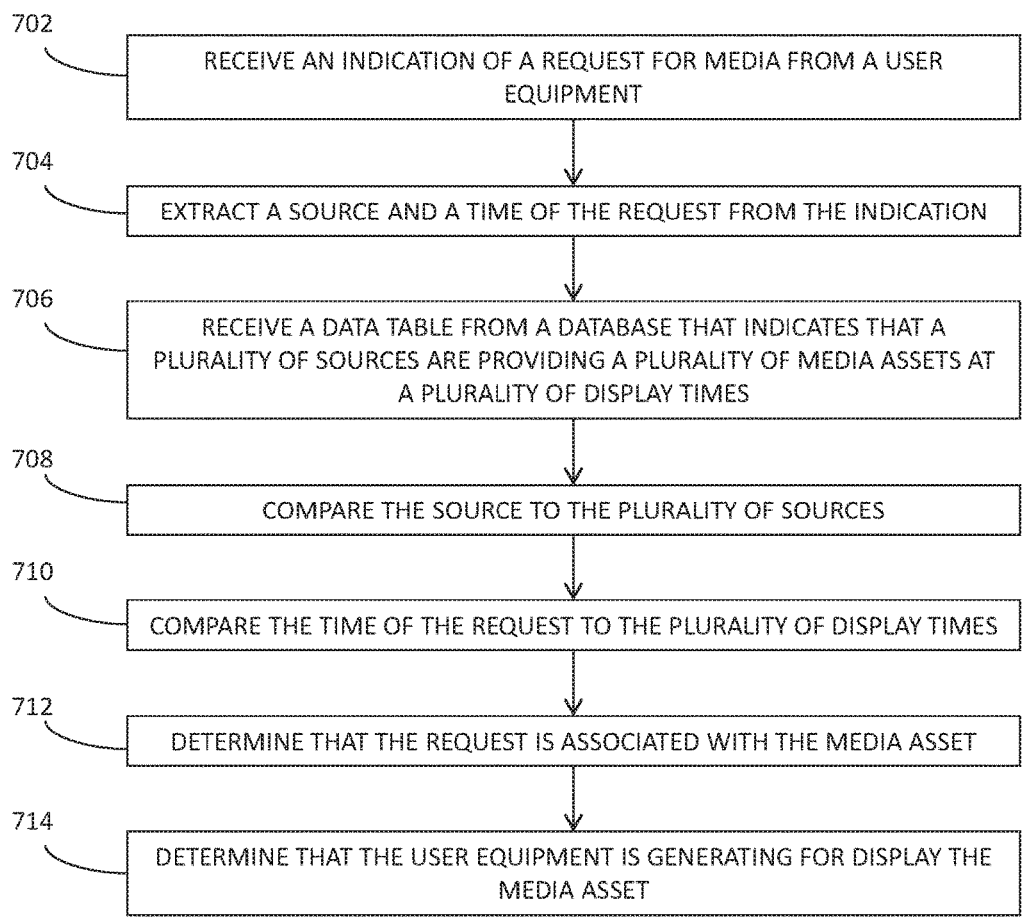
FIG. 7 is a flowchart of illustrative steps for determining that a plurality of user equipment corresponding to a plurality of users are generating for display a media asset, in accordance with some embodiments of the disclosure.

FIG. 7 is a flowchart of illustrative steps for determining that a plurality of user equipment corresponding to a plurality of users are generating for display a media asset, in accordance with some embodiments of the disclosure. For example, a media guidance application may instruct control circuitry 404 to execute the elements of process 700. Process 700 may be executed as part of 602 in process 600 of FIG. 6.

Process 700 begins at 702, where the media guidance application receives (e.g., via control circuitry 404) an indication of a request for media from a user equipment (e.g., user equipment 502, 504, and 506). Process 700 continues to 704, where the media guidance application extracts (e.g., via control circuitry 404) the source and the time of the request from the indication of a request for media. For example, the media guidance application may determine that the source requested was channel 3, and the time of the request was 6:30 PM.

Process 700 continues to 706, where the media guidance application receives (e.g., via control circuitry 404) a presentation data table from a database (e.g., storage 408 and media guidance data source 518 over communications network 514) that indicates that a plurality of sources (e.g. media content source 516) are providing a plurality of media assets at a plurality of display times. As used herein, a "presentation data table" is defined to mean a data structure that relates media assets, sources, and display times. Because the indication for the request for media may not indicate the title of the media asset, it may be important that the media guidance application identify the media asset displayed in response to the request. In some embodiments, the presentation data table may be a list of entries, each entry including a field containing an identifier of a source (e.g. media content source 516), a field containing an identifier of a start time, a field containing an identifier of an end time, and a field containing an identifier of a media asset being provided by the source between the start time and the end time. In other embodiments, the media guidance application may determine that the data table is a matrix, where the columns, for example, represent time periods and the rows represent sources. The data table may have row identifiers for each row identifying the source represented by the respective row, and may have column identifiers for each column identifying the time period represented by the respective column. Each entry in a respective row and respective column in the matrix may contain an identifier of a media asset being provided on the source corresponding to the respective row and during the time period corresponding to the respective column.

Process 700 continues to 708, where the media guidance application compares (e.g., via control circuitry 404) the source to the plurality of sources. In some embodiments, the media guidance application may compare the source to the plurality of sources by searching (e.g., via control circuitry 404) the data table for all entries that include an identifier of the source in the field containing the identifier of a source. The media guidance application may store the results of the search in memory (e.g., in storage 408). In some embodiments, the media guidance application may compare the source to the plurality of sources by searching the row identifiers of the matrix to identify the row that corresponds to the source.

Process 700 continues to 708, where the media guidance application compares (e.g., via control circuitry 404) the time of the request to the plurality of display times. For example, the media guidance application may compare the time of the request to the plurality of display times by accessing the results of the search from the memory (e.g., storage 408) and searching the results to identify a final entry that has a start time less than or equal to the time of the request and an end time greater than the time of the request. In some embodiments, the media guidance application may compare the time of the request to the plurality of display times by searching (e.g., via control circuitry 404) the column identifiers to identify the column that corresponds to a time period that encapsulates the time of the request.

Process 700 continues to 708, where the media guidance application determines (e.g., via control circuitry 404) that the request is associated with the media asset. In some embodiments, to determine that the request is associated with the media asset, the media guidance application may extract (e.g., via control circuitry 404), from the field of the final entry containing an identifier of a media asset, the identifier of the media asset to associate the request with the media asset. In some embodiments, to determine that the request is associated with the media asset, the media guidance application may access (e.g., via control circuitry 404) the entry in the matrix corresponding to the identified column and the identified row. The media guidance application may extract, from the entry, the identifier of the media asset to associate the request with the media asset.

Process 700 continues to 714, where the media guidance application determines (e.g., via control circuitry 404) that the user equipment is generating for display the media asset. The media guidance application may determine that the user equipment is generating for display the media asset by determining that the request is associated with the media asset. Because the request is associated with the media asset, the user equipment from which the indication of the request for media is generating for display the media asset.

Figure 8:
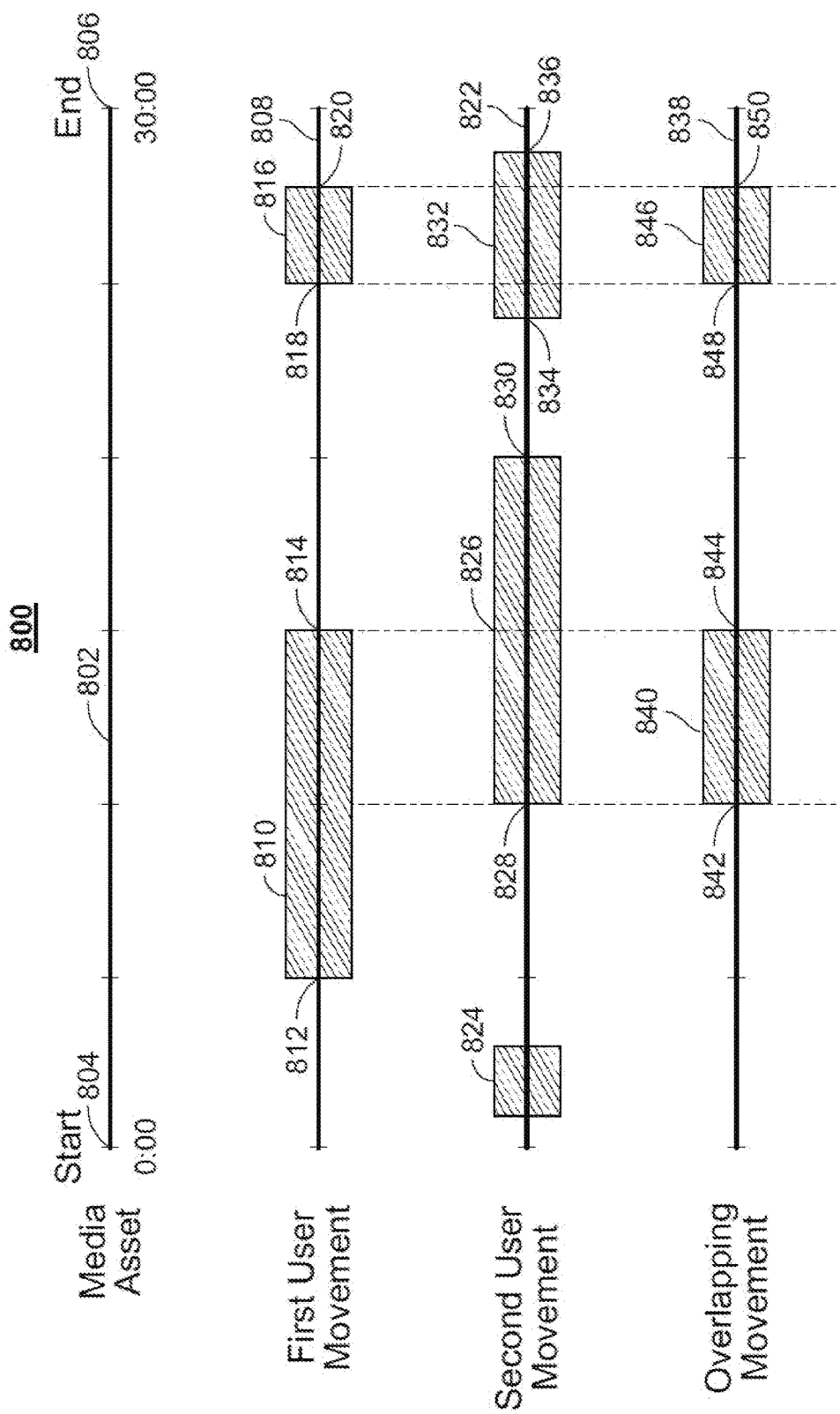
FIG. 8 shows an illustrative example of a graphic representation of information contained in illustrative data structures used to determine an overlapping portion of a media asset during which a first and second user were moving, in accordance with some embodiments of the disclosure.

FIG. 8 shows an illustrative example of a graphic representation of information contained in illustrative data structures used to determine an overlapping portion of a media asset during which a first and second user were moving, in accordance with some embodiments of the disclosure. For example, timeline 802 may represent a data structure representing the display of the media asset or a portion thereof, timeline 808 may represent the first movement log, timeline 822 may represent the second data structure, and timeline 838 may represent the data structure of overlapping portions. The data structures corresponding to timelines 802, 808, 822, and 838 may be stored in storage (e.g., storage 408) of one or more user equipment (e.g., any of the user equipment listed in FIGS. 4-5), or remotely at a server (e.g., media guidance data source 518) accessible via a communications network (e.g., communications network 514). The media guidance application may be executed by one or more user equipment (e.g., any of the user equipment listed in FIGS. 4-5) to store and fetch data from the data structures corresponding to timelines 802, 808, 822, and 838.

Timeline 802 may represent the timeline for the display of the media asset, or a portion thereof. The media asset may start at start time 804, and end at end time 806. For example, the media asset may start at 0 minutes and may end at 30 minutes. In some embodiments, timeline 802 may represent only the display of the media asset and not include any supplemental video content included during the display of the media asset. For example, supplemental video content may be inserted at minute seven of the media asset, however, the time of the supplemental video content is not included in timeline 802. Only including in the timeline the display of the media asset prevents movement events during the display of supplemental video content from being included in the audience engagement calculation. In other embodiments, timeline 802 may represent both the display of the media asset in addition to the display of supplemental video content. For example, supplemental video content may be shown from the seventh minute to the eighth minute of timeline 802. Inclusion of the supplemental video content in the timeline may help to determine audience engagement during the supplemental video content.

Timeline 808 may represent the movement of a first user. For example, timeline 808 may be a graphical representation of the first movement log as described above in relation to 604 of process 600 in FIG. 6. Timeline 808 may be correlated to timeline 802, and thus may represent movement occurring while the first user equipment (e.g., user equipment 502, 504, and 506) is generating for display the media asset. The media guidance application may correlate timeline 802 and timeline 808 as described above with relation to 606 in process 600 of FIG. 6. Timeline 808 contains two movement events, movement event 810 and movement event 816. Movement event 810 may start at start time 812 and end at end time 814. For example, start time 812 may be the start time of the first portion (e.g., the fifth minute of the media asset) described in 606 in process 600 of FIG. 6. End time 814 may be the end time of the first portion (e.g. the fifteenth minute of the media asset). Movement event 816 may start at start time 818 and end at end time 820. For example, start time 818 may be at the twenty-fifth minute of the media asset, and end time 820 may be at the twenty-eighth minute of the media asset.

Timeline 822 may represent the movement of a second user. For example, timeline 822 may be a graphical representation of the second movement log as described above in relation to 604 of process 600 in FIG. 6. Timeline 822 may be correlated to timeline 802, and thus may represent movement occurring while the second user equipment (e.g., user equipment 502, 504, and 506) is generating for display the media asset. The media guidance application may correlate timeline 802 and timeline 822 as described above with relation to 608 in process 600 of FIG. 6. Timeline 808 contains three movement events, movement event 824, movement event 826, and movement event 832. Movement event 824 may start at start time 828 and end at end time 830. For example, start time 828 may be the start time of the second portion (e.g., the tenth minute of the media asset) described in 608 in process 600 of FIG. 6. End time 830 may be the end time of the second portion (e.g., the twentieth minute of the media asset). Movement event 832 may start at start time 834 and end at end time 836. For example, start time 834 may be at the twenty-fourth minute of the media asset, and end time 836 may be at the twenty-ninth minute of the media asset.

Timeline 838 may represent portions of the media asset during which the first and second user were moving. For example, timeline 838 may be a graphical representation of the data structure of overlapping portions as described above in the discussion of 618 of process 600 in FIG. 6. Media guidance application may create the data structure for timeline 838 as described above in the discussion of 610 and 618 of process 600 in FIG. 6.

Timeline 838 contains two overlapping portions, overlapping portion 840 and overlapping portion 846. It should be noted that movement event 824 of timeline 822 does not overlap with any movement event in timeline 808, and therefore does not contribute to any overlapping portion. Overlapping portion 840 starts at start time 842 and ends at end time 844. For example, start time 842 may be the start time of the overlapping portion (e.g., the tenth minute of the media asset) described in 610 in process 600 of FIG. 6. End time 844 may be the end time of the overlapping portion (e.g., the fifteenth minute of the media asset). Start time 842 corresponds to start time 828 of timeline 822, and end time 844 corresponds to end time 814 of timeline 808. Overlapping portion 840 may be determined as described above in relation to 610 of process 600 in FIG. 6, and described further below in FIG. 9. Overlapping portion 846 starts at start time 848 and ends at end time 850. Start time 848 may correlate to start time 818 of timeline 808 (e.g., the twenty-fifth minute), and end time 850 may correlate to end time 820 of timeline 808 (e.g., the twenty eighth minute). Overlapping portion 840 may be determined as described above in relation to 610 and 618 of process 600 in FIG. 6, and described further below in FIG. 9.

Figure 9:
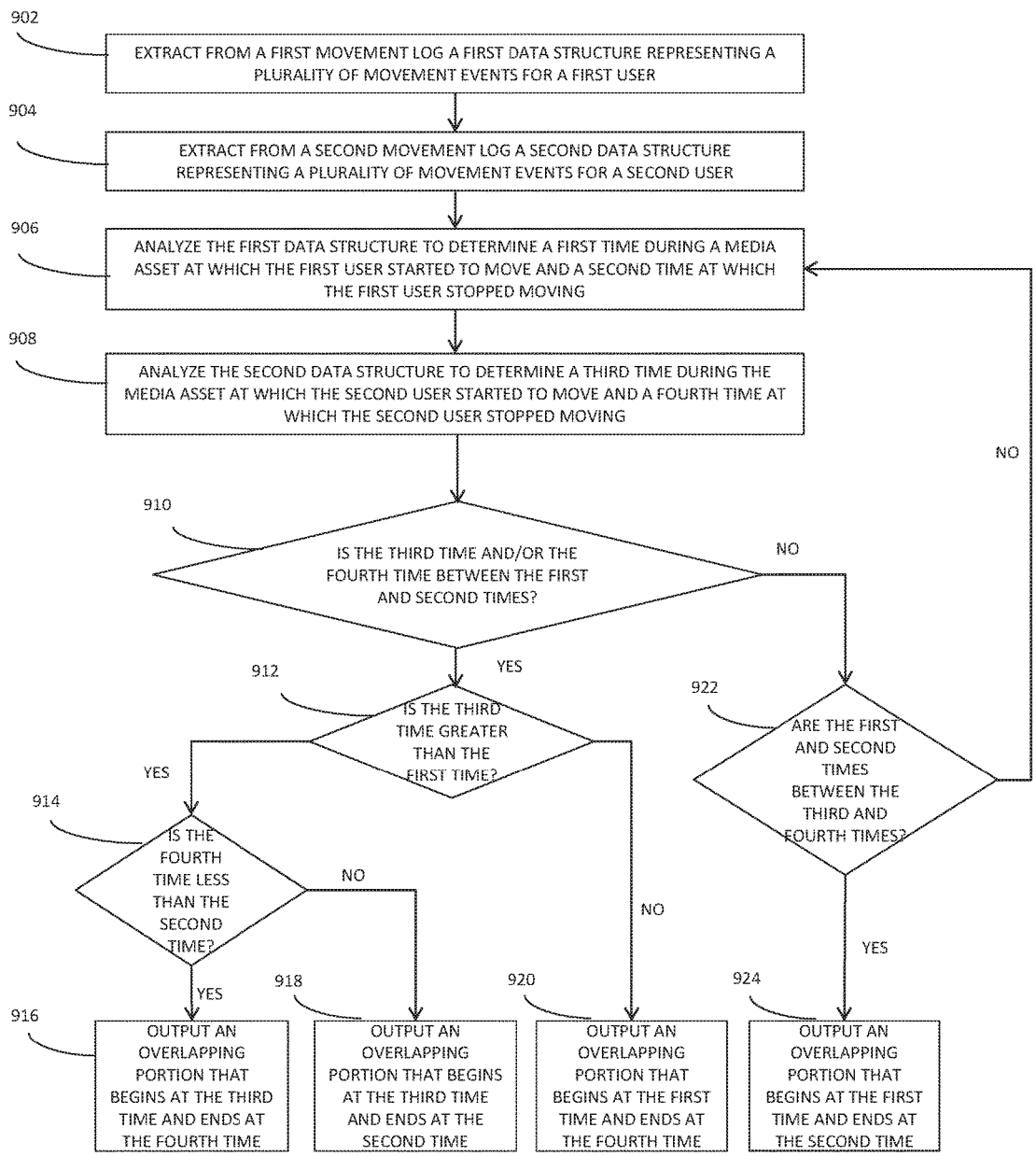
FIG. 9 is a flowchart of illustrative steps for analyzing data structures from two movement logs to determine an overlapping portion of a media asset during which a first and a second user were moving, in accordance with some embodiments of the disclosure.

FIG. 9 is a flowchart of illustrative steps for analyzing data structures from two movement logs to determining an overlapping portion of a media asset during which a first and a second user were moving, in accordance with some embodiments of the disclosure. Process 900 may be executed as part of 610 in process 600 of FIG. 6. For example, a media guidance application may instruct control circuitry 404 to execute the elements of process 900.

Process 900 begins at 902, where the media guidance application extracts (e.g., via control circuitry 404) from a first movement log a first data structure representing a plurality of movement events for a first user. For example, the first movement log may be the first movement log as described in relation to 604 in process 600 of FIG. 6. Process 900 continues to 904, where the media guidance application extracts (e.g., via control circuitry 404) from a second movement log a second data structure representing a plurality of movement events for a second user. For example, the second movement log may be the second movement log as described in relation to 604 in process 600 of FIG. 6.

Process 900 continues to 906, where the media guidance application analyzes (e.g., via control circuitry 404) the first data structure to determine a first time during a media asset at which the first user started to move and a second time at which the first user stopped moving. For example, to determine the first time and the second time, the media guidance application may determine (e.g., via control circuitry 404) a first portion as described above in relation to 606 in process 600 of FIG. 6. The media guidance application may proceed to identify the start time (e.g., the fifth minute) of the first portion as the first time and may identify the end time (e.g., the fifteenth minute) of the first portion as the second time.

Process 900 continues to 908, where the media guidance application analyzes (e.g., via control circuitry 404) the second data structure to determine a third time during a media asset at which the second user started to move and a fourth time at which the second user stopped moving. For example, the media guidance application may determine (e.g., via control circuitry 404) the second portion as described above in relation to 608 in process 600 of FIG. 6. For example, to determine the third time and the fourth time, media guidance application may determine (e.g., via control circuitry 404) a second portion as described above in relation to 608 in process 600 of FIG. 6. The media guidance application may proceed to identify the start time (e.g., the tenth minute) of the second portion as the third time and may identify the end time (e.g., the twentieth minute) of the second portion as the fourth time.

To determine the overlapping portion, the media guidance application may determine what portion of the first and second portions is completely contained within both the first and second portions. Five scenarios are possible for a first and second portion: the first portion is completely encompassed by the second portion (e.g., movement event 816 and movement event 832), the second portion is completely encompassed by the first portion, the first portion starts before the start of the second portion but ends between the start and end time of the second portion (e.g., movement event 810 and movement event 830), the second portion starts before the start of the first portion but ends between the start and end time of the first portion, or there is no overlap. The media guidance application may determine which scenario the first and second portions fall into using process 900.

Process 900 continues to 908, where the media guidance application determines (e.g., via control circuitry 404) if the third time and/or the fourth time is between the first and second time, that is, that the third time and/or fourth time is greater than the first time but less than the second time. If the media guidance application determines that neither the third nor the fourth time is between the first and second time, process 900 continues to 922, where the media guidance application determines (e.g., via control circuitry 404) if the first and second time are both between the third and fourth times, that is, that both the first time and second time are greater than the third time and less than the fourth time. If the media guidance application determines that the first and second time are both between the third and fourth times, process 900 continues to 924, where the media guidance application outputs (e.g., via control circuitry 404) an overlapping portion (e.g., overlapping portion 846) that begins at the first time and ends at the second time.

If, at 922 of process 900, the media guidance application determines that the first and second times are not between the third and fourth times and therefore do not overlap, process 900 continues to 906 and 908, where the media guidance application may determine (e.g., via control circuitry 404) a new first time, a new second time, a new third time, and a new fourth time based on the first and second data structures as described above. At least one of the new first and second times, and the new third and fourth times, are different than their original counterparts, such that a new comparison can be made.

Returning to 908 of process 900, if the media guidance application determines that the third time and/or the fourth time is between the first and second time, process 900 continues to 912, where the media guidance application determines (e.g., via control circuitry 404) if the third time is greater than the first time. If the media guidance application determines that the third time is not greater than the first, process 900 continues to 920, where the media guidance application outputs (e.g., via control circuitry 404) an overlapping portion that begins at the first time and ends at the fourth time.

If, at 922 of process 900, the media guidance application determines that the third time is greater than the first, process 900 continues to 914, where the media guidance application determines (e.g., via control circuitry 404) if the fourth time is less than the second time. If the media guidance application determines that the fourth time is less than the second time, process 900 continues to 916, where the media guidance application outputs (e.g., via control circuitry 404) an overlapping portion that begins at the third time and ends at the fourth time. If, at 914 of process 900, the media guidance application determines that the fourth time is not less than the second time, process 900 continues to 918, where the media guidance application outputs (e.g., via control circuitry 404) an overlapping portion that begins at the third time and ends at the second time (e.g., overlapping portion 840 and the overlapping portion as described in relation to 610 in process 600 of FIG. 6).

Figure 10:
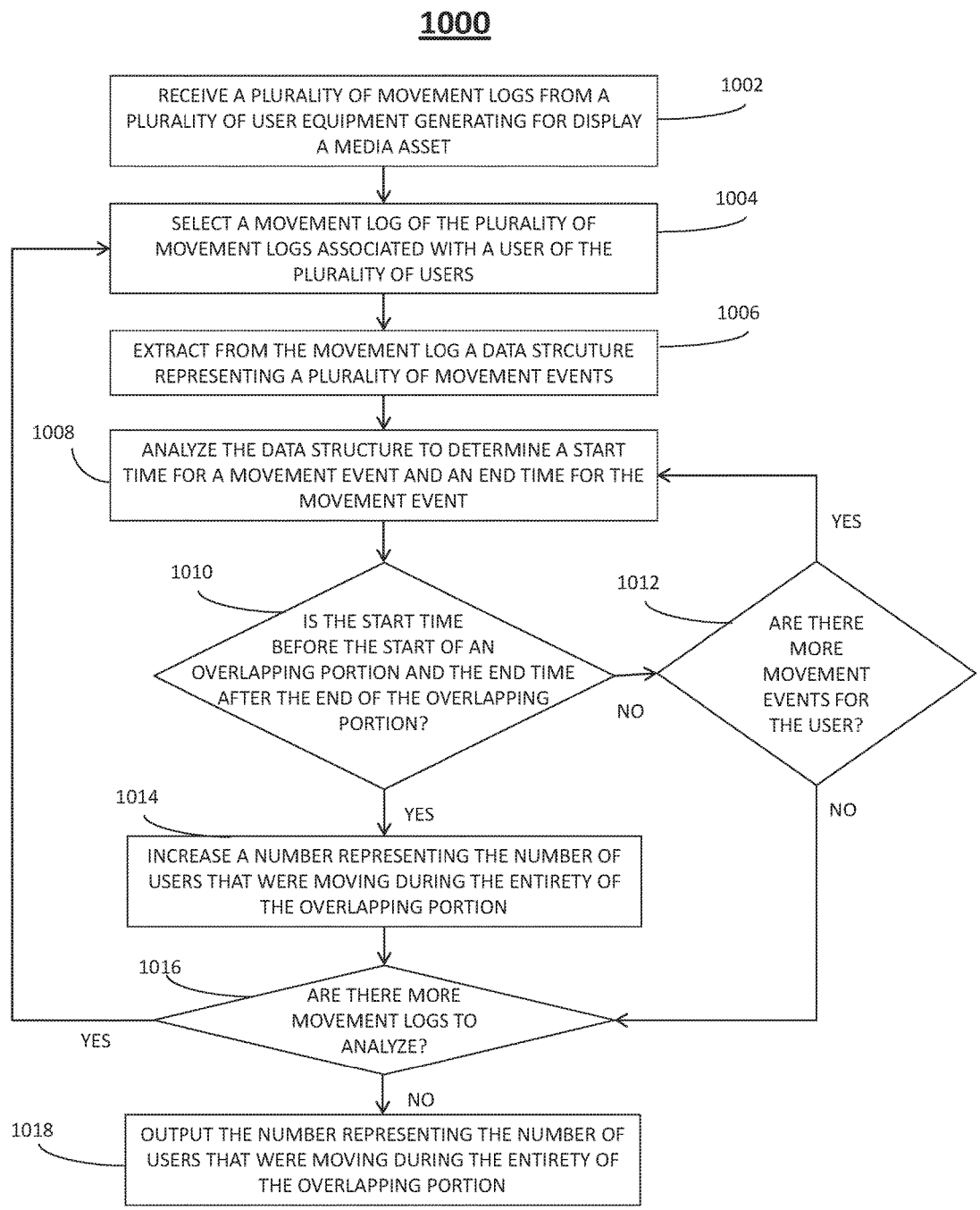
FIG. 10 is a flowchart of illustrative steps for determining the number of users that were moving during an entirety of an overlapping portion of a media asset, in accordance with some embodiments of the disclosure.

FIG. 10 is a flowchart of illustrative steps for determining the number of users that were moving during an entirety of an overlapping portion of a media asset, in accordance with some embodiments of the disclosure. Process 1000 may be executed as part of 612 in process 600 of FIG. 6. For example, a media guidance application may instruct control circuitry 404 to execute the elements of process 1000.

Process 1000 begins at 1002, where the media guidance application receives (e.g., via control circuitry 404) a plurality of movement logs from a plurality of user equipment (e.g., user equipment 502, 504, and 506) generating for display (e.g., on display 412) a media asset. For example, the media guidance application may receive the plurality of movement logs in a similar manner as described in 612 of process 600 in FIG. 6.

Process 1000 continues to 1004, where the media guidance application selects (e.g., via control circuitry 404) a movement log of the plurality of movement logs associated with a user of the plurality of users. The media guidance application may select the movement log based on an order in which the plurality of movement logs were received, or may select the movement log randomly. The media guidance application may create a data structure containing the plurality of movement logs, and may select the first movement log in the data structure.

Process 1000 continues to 1006, where the media guidance application extracts (e.g., via control circuitry 404), from the movement log, a data structure representing a plurality of movement events. Process 1000 continues to 1008, where the media guidance application analyzes (e.g., via control circuitry 404) the data structure to determine a start time for a movement event and an end time for the movement event. In some embodiments, to determine the start time and an end time of a movement event, the media guidance application may select (e.g., via control circuitry 404) a movement event at random from the data structure.

In other embodiments, the media guidance application may select (e.g., via control circuitry 404) a movement event in the order the movement event occurred. In other embodiments, the media guidance application may create (e.g., via control circuitry 404) and store (e.g., in storage 408) a temporary list with all of the movement events of the movement log, and select the first entry in the temporary list. To determine the start time and end time of the selected movement event, the media guidance may extract (e.g., via control circuitry 404), from the data structure of the movement log, a start time of the movement event and an end time of the movement event. The media guidance application may do so in a similar manner as described in relation to 606 in process 600 in FIG. 6 and 906 in process 900 in FIG. 9. For example, the media guidance application may determine that the start time of a movement event is the second minute of the media asset and the end time of the movement event is the sixteenth minute of the media asset.

Process 1000 continues to 1010, where the media guidance application determines (e.g., via control circuitry 404) whether the start time is before the start of an overlapping portion (e.g., overlapping portion 840 of FIG. 8 and the overlapping portion as discussed in relation to 610 of process 600 of FIG. 6) and the end time is after the end of the overlapping portion. If the media guidance application determines that either the start time is not before the start of an overlapping portion or the end time is not after the end of the overlapping portion, e.g., the user was not moving for the entirety of the overlapping portion, process 1000 continues to 1012 where the media guidance application determines (e.g., via control circuitry 404) if there are more movement events for the user. For example, the media guidance application may determine whether the movement event is the last movement event in the temporary list. If the media guidance application determines that there are other movement logs e.g., by determining that the movement event is not the last movement event in the temporary list, process 1000 continues to 1008 where the media guidance application analyzes (e.g., via control circuitry 404) a new movement event. If, at 1012 of process 1010, the media guidance application instead determines that there are other movement logs, process 1000 continues to 1016.

Returning to 1010 of process 1000, if the media guidance application determines that the start time is before the start of an overlapping portion and the end time is after the end of the overlapping portion, e.g., the user was moving for the entirety of the overlapping portion, process 1000 continues to 1014 where the media guidance application increases (e.g., via control circuitry 404) a number representing the number of users that were moving during the entirety of the overlapping portion. The number may be the counter as discussed in relation to 612 of process 600 in FIG. 6. The number may be stored in storage (e.g., in storage 408) after each increment.

Process 1000 continues to 1016, where the media guidance application determines (e.g., via control circuitry 404) if there are more movement logs to analyze. This is to ensure that all received movement logs are analyzed. In some embodiments, after receiving the plurality of movement logs in 1002 of 1000, the media guidance application may create (e.g., via control circuitry 404) and store (e.g., in storage 408) a list of the plurality of movement logs. In order to keep track of the movement logs already analyzed such that the media guidance application may determine that there are no more movement logs, upon continuing to 1016 of process 1000, the media guidance application may remove (e.g., via control circuitry 404) the movement log selected in 1004 of process 1000 from the list. To determine whether there are more movement logs to analyze, the media guidance application may then determine (e.g., via control circuitry 404) if the length of the list is zero at 1016 of process 1000. If the media guidance application determines that the length of the list is greater than zero, then there are additional movement logs to analyze, and process 1000 continues to 1004 and the media guidance application selects a next movement log of the plurality of movement logs. This process may continue until the media guidance application determines that the length of the list is zero, meaning there are no additional movement logs to analyze and all movement logs have been analyzed, in which case process 1000 continues to 1018.

In other embodiments, in order to determine (e.g., via control circuitry 404) if there are more movement logs to analyze, the media guidance application may create (e.g., via control circuitry 404) and store (e.g., in storage 408) a second counter, and increment the second counter upon reaching 1016 of process 1000. The media guidance application may determine, at 1016 of process 1000, that the second counter is less than the number of received movement logs to determine that there are more movement logs to analyze. In response, process 1000 continues to 1004 and a new movement log of the plurality of movement logs is selected. If, at 1016 of process 1000, the media guidance application determines that the second counter is equal to the number of received movement logs, e.g., that there are no additional movement logs to analyze, process 1000 continues to 1018.

Process 1000 continues to 1018, where the media guidance application outputs (e.g., via control circuitry 404) the number representing the number of users that were moving during the entirety of the overlapping portion. In some embodiments, the media guidance application may output the first counter, as discussed above. The media guidance application may, in turn, use the counter in 614 of process 600 of FIG. 6.

Figure 11:
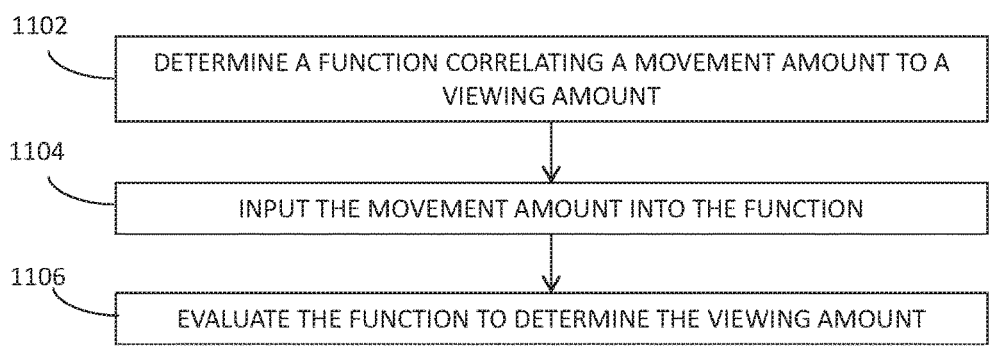
FIG. 11 is a flowchart of illustrative steps for inferring how much of the media asset was viewed by the plurality of users, in accordance with some embodiments of the disclosure.

FIG. 11 is a flowchart of illustrative steps for inferring how much of the media asset was viewed by the plurality of users, in accordance with some embodiments of the disclosure. Process 1100 may be executed as part of 618 in process 600 of FIG. 6. For example, a media guidance application may instruct control circuitry 404 to execute the elements of process 1100.

Process 1100 begins at 1102, where the media guidance application determines (e.g., via control circuitry 404 from storage 408) a function correlating a movement amount to a viewing amount. In some embodiments, the media guidance application may access (e.g., via control circuitry 404) the function from a database (e.g., media guidance data source 518) or storage (e.g., storage 408).

A "function correlating a movement amount to a viewing amount" may be any subroutine into which a movement amount is input that outputs a viewing amount when executed. The function correlating a movement amount to a viewing amount may inversely correlate the movement amount and the viewing amount. For example, the media guidance application may determine that the function indicates that the viewing amount is one minus the movement amount.

In some embodiments, the function may take multiple inputs, for example, biometric data or other movement event data described above in relation to 620 of process 600 in FIG. 6. As an illustrative example, if the media guidance application determines that, on average, users tended to have many changes in heart rate during the program (accelerations/decelerations) by analyzing data structures received from the plurality of user equipment containing the times of the accelerations in a similar manner to process 600 in FIG. 6, the function may yield, on average, lower viewing scores. Many accelerations of heart rate may indicate that the user was distracted or their focus shifted while viewing the program. Alternatively, if the media guidance application determines (e.g., via control circuitry 404), by accessing metadata associated with the media asset, that the program is in the genre "Horror," more accelerations of users' heart rates, or increases in the respiratory rate, may indicate that the users were paying more attention, and thus lead to an on average increase in the viewing amount by inputting the average number of increases in the heart rate/respiratory rate of the users into the function.

In some embodiments, the function may accept movement intensities or characteristics of movement events as an input. For example, as described above in relation to 604 of process 600 in FIG. 6, the movement logs may contain movement intensities or may be useable to infer movement intensities. For example, if the media guidance application determines that the aggregated movement intensities for the overlapping portions are on average high, then the viewing amounts may be on average lowered. However, if the media guidance application determines that the movement intensities for the overlapping portions indicate that the users were on average engaged with the media asset, as described in relation to 616 of process 600 in FIG. 6, then the viewing amounts may be on average higher.

Process 1100 continues to 1104, where the media guidance application inputs (e.g., via control circuitry 404) the movement amount into the function. For example, the media guidance application may call (e.g., via control circuitry 404) the function subroutine from memory (e.g. from storage 408) and input the movement amount into the call of the subroutine. Additionally, the media guidance application may input any additional data into the call of the subroutine. Process 1100 continues to 1106, the media guidance application evaluates (e.g., via control circuitry 404) the function to determine the viewing amount for the media asset. In some embodiments, the media guidance application may output the viewing amount for the media asset. In some embodiments, the media guidance application may store (e.g., in storage 408) the viewing amount for the media asset.

Figure 12:
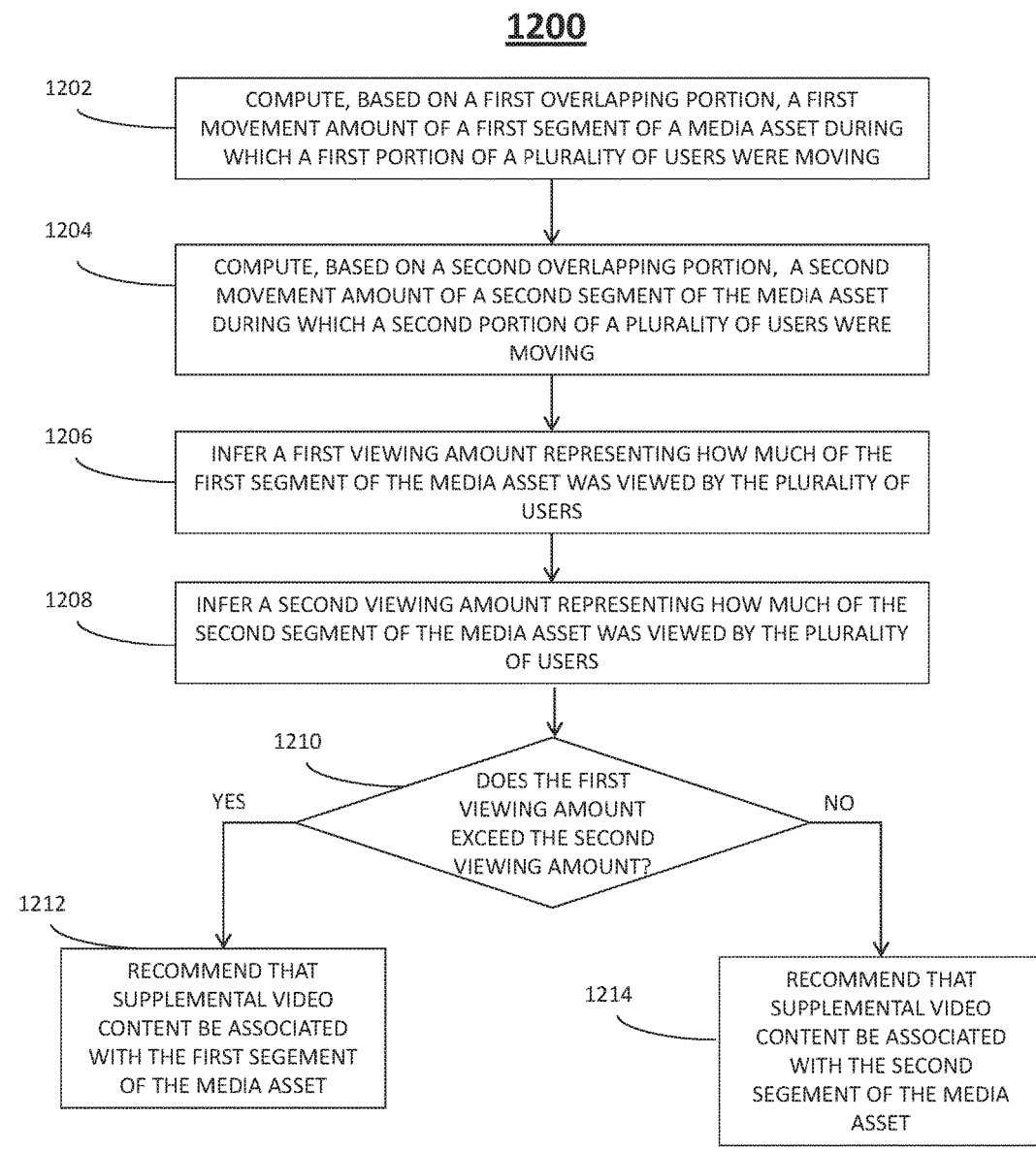
FIG. 12 is a flowchart of illustrative steps for determining and recommending that supplemental video content be associated with a first segment or a second segment of a media asset, in accordance with some embodiments of the disclosure.

FIG. 12 is a flowchart of illustrative steps for determining and recommending that supplemental video content be associated with a first segment or a second segment of a media asset, in accordance with some embodiments of the disclosure. For example, a media guidance application may instruct control circuitry 404 to execute the elements of process 1200. In this way, the media guidance application may recommend segments to supplemental video providers that are most viewed by the users. This may ultimately allow supplemental video providers to reach the widest audience.

Process 1200 begins at 1202, where the media guidance application computes (e.g., via control circuitry 404), based on a first overlapping portion (e.g., overlapping portion 840), a first movement amount of a first segment of a media asset during which a first portion of a plurality of users were moving. For example, in order to calculate the first movement amount, the media guidance application may determine (e.g., via control circuitry 404) that the first overlapping portion may be overlapping portion 840 of FIG. 8. The media guidance application may compute (e.g., via control circuitry 404) the first movement amount as described above in relation to 618 of process 600 in FIG. 6. For example, the media guidance application may determine that the first overlapping portion is the overlapping portion as described above in relation to 610 of process 600 in FIG. 6, which is five minutes long (from the tenth minute to the fifteenth minute of the media asset) and may be the only overlapping portion in the first segment, which may be thirty minutes long (from the start of the program to the thirtieth minute). Thus, the media guidance application may determine that the movement amount for the first segment may be 16.7% by dividing the total duration of five minutes for the overlapping portion by the total length of the segment of 30 minutes.

Process 1200 continues to 1204, where the media guidance application computes (e.g., via control circuitry 404), based on a second overlapping portion, a second movement amount of a second segment of the media asset during which a second portion of the plurality of users were moving. For example, the media guidance application may compute (e.g., via control circuitry 404) the second movement amount in a similar manner as described above in relation to 618 of process 600 in FIG. 6 and as described above in relation to 1202 of process 1200. For example, the media guidance application may determine that the second overlapping portion is the portion of the media asset lasting from the thirty-second minute to the thirty-sixth minute, and may be four minutes long. The media guidance application may determine that the second overlapping portion is the only overlapping portion in the second segment, which may be ten minutes long (from the thirtieth minute of the program to the fortieth minute). Thus, the media guidance application may determine that the movement amount for the first segments is 40%.

Process 1200 continues to 1206, where the media guidance application infers (e.g., via control circuitry 404) a first viewing amount representing how much of the first segment of the media asset was viewed by the plurality of users. For example, the media guidance application (e.g., via control circuitry 404) may infer the first viewing amount in a manner similar to the processes described above in relation to 620 of process 600 in FIG. 6 or in relation to process 1100 in FIG. 11. For example, the media guidance application may determine that a function correlating a movement amount to a viewing amount, by accessing a database (e.g., media guidance data source 518), that the function is one minus the movement amount. The media guidance application may execute the function and determine that the first viewing amount is 83.3%.

Process 1200 continues to 1208, where the media guidance application infers (e.g., via control circuitry 404) a second viewing amount representing how much of the second segment of the media asset was viewed by the plurality of users. For example, the media guidance application (e.g., via control circuitry 404) may infer the second viewing amount in a manner similar to the processes described above in relation to 620 of process 600 in FIG. 6, in relation to process 1100 in FIG. 11, or in relation to 1208 of process 1200. For example, the media guidance application may determine (e.g., via control circuitry 404) that the second viewing amount is 60%.

Process 1200 continues to 1210, where the media guidance application determines (e.g., via control circuitry 404) whether the first viewing amount exceeds the second viewing amount.

If the media guidance application determines that the first viewing amount exceeds the second viewing amount, process 1200 continues to 1212, where the media guidance application recommends (e.g., via control circuitry 404) that supplemental video content be associated with the first segment of the media asset. This recommendation may allow supplemental content providers to choose the segment in a media asset that more users were engaged with, meaning that more users are likely to be engaged with supplemental video content inserted into that segment. As used herein, "content associated with" media is defined to mean content chosen for display immediately before, during, for the entirety of, or immediately after the display of the media the video content is associated with. For example, video content, such as a director's commentary on a scene or a blooper reel for the scene, may be associated with the scene, such that the director's commentary is displayed immediately after the scene or as an overlay displayed simultaneously with the scene. Content such as textual commentary, trivia, additional information, social media posts, still images, or any other suitable content may be displayed simultaneously with the scene in an overlay or as a distinct section of the screen.

In some embodiments, the media guidance application may automatically associate (e.g., via control circuitry 404) the supplemental video content with the first segment of the media asset without further user input in response to determining that the first viewing amount exceeds the second viewing amount. The media guidance application may automatically associate the supplemental video content with the first segment of the media asset by storing an association data structure in storage (e.g., storage 408 and media guidance data source 518). As used herein, an "association data structure" is a data structure that identifies supplemental video content and media, and is used to determine at what time of the media asset to insert the supplemental video content. For example, an association data structure may include any or all of a field containing an identifier of the media asset, a field containing an identifier of the first segment, and a field containing an identifier of the supplemental video content, and an identifier of a time in the first segment of the media asset at which the supplemental video content should be inserted. This may allow user equipment (e.g., user equipment 502, 504, and 506) to determine what supplemental video content to access (e.g., from supplemental content source 524 over communications network 514) and when, while generating for display the media asset, to insert the supplemental video content. For example, the media guidance application may receive (e.g., from media guidance data source 516 over communications network 514) the association data structure with the media asset. The media guidance application may extract the identifier of a time in the first segment of the media asset at which the supplemental video content should be inserted, and at that time, access (e.g., from supplemental content source 524) the supplemental content and generate said supplemental video content for display.

In some embodiments, the media guidance application may recommend that the supplemental video content be associated with the first segment of the media asset by generating for display (e.g., on display 420) an alert identifying the first segment of the media asset and the supplemental content. In some embodiments, the media guidance application may receive (e.g., via control circuitry 404) a user selection of the alert, or an option in the alert, to associate supplemental video content with the first segment of the media asset. In response, the media guidance application may associate the supplemental content with the media asset, as discussed above.

Returning to 1210 of process 1200, if the media guidance application determines that the second viewing amount does not exceed the second viewing amount, process 1200 continues to 1214, where the media guidance application recommends (e.g., via control circuitry 404) that supplemental video content be associated with the second segment of the media asset. This may be similar to the recommendation as described above in relation to 1212 of process 1200 in FIG. 12.

Segments or programs with similar characteristics may keep the audience engaged to a similar degree. For example, an action scene or a fight scene may keep audiences more engaged than a drama or exposition scene. The media guidance application may associate supplemental video content based on the determination that a certain characteristic is more engaging. In this way, the media guidance application may not have to determine viewing amounts for every media asset of a plurality of media assets to recommend with what segments of the plurality of media assets supplemental video content should be associated, but may rather use data relating to segment characteristics to make a similar recommendation.

In some embodiments, the media guidance application may determine (e.g., via control circuitry 404) that the first segment is associated with a first characteristic and the second segment is associated with a second characteristic in order to determine which characteristic may be more engaging. For example, the first or second characteristic may be any one of genre, order in the media asset (e.g., first or second segment), type (e.g., supplemental content or program), length, on-screen event (e.g., fight scene, romantic reunion), Freytag phase (e.g., exposition, climax), user rating, popularity, or any other suitable characteristic or combination thereof. For example, the media guidance application may determine (e.g., via control circuitry 404) the first characteristic and the second characteristic by analyzing metadata associated with the media asset.

In some embodiments, the media guidance application may identify (e.g., via control circuitry 404), after determining that the first viewing amount exceeds the second viewing amount in 1210 of process 1200 in FIG. 12, a second media asset comprising a third segment associated with the first characteristic, as the first characteristic has been determined to be more engaging to the user when compared to the second characteristic. For example, the media guidance application may identify the third segment by searching a database of media assets (e.g., in storage 408). The media guidance application may search the database to identify a data structure with a field containing an identifier of the first characteristic. The media guidance application may extract (e.g., via control circuitry 404), from the data structure, the name of the media asset and an identifier of the third segment. The media guidance application may recommend, in a manner similar to the recommendation as discussed in relation to 1212 of process 1200 in FIG. 12, that the supplemental video content be associated with the third segment of the second media asset.

Figure 13:
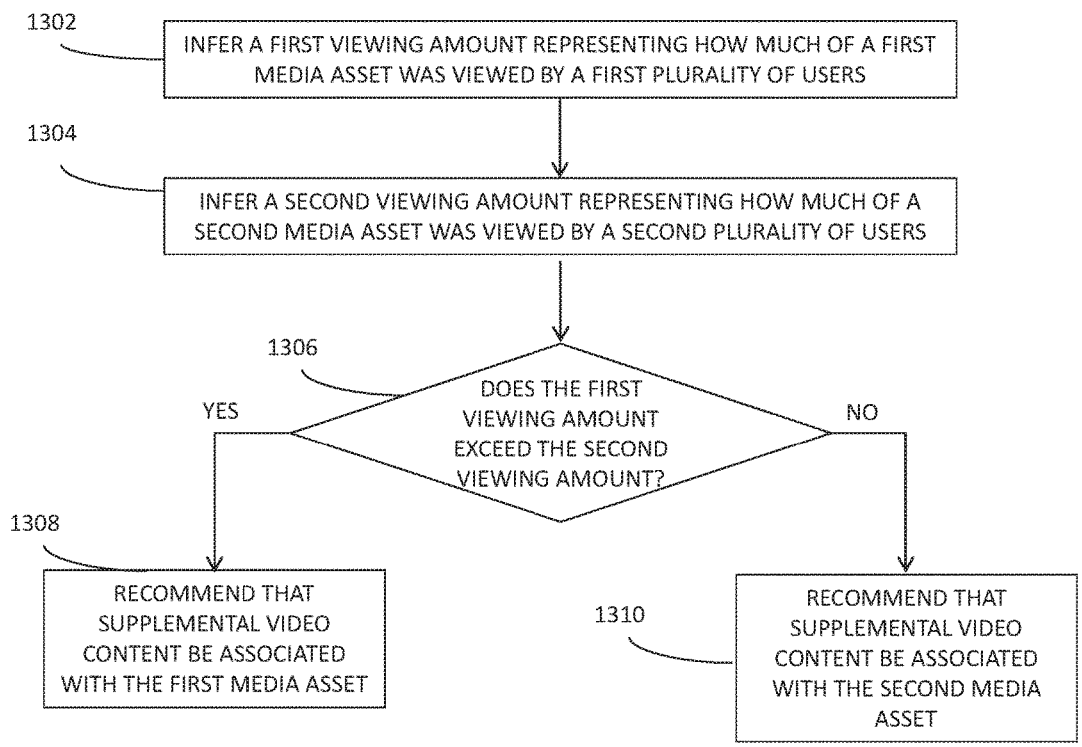
FIG. 13 is a flowchart of illustrative steps for determining and recommending that supplemental video content be associated with a first media asset or a second media asset, in accordance with some embodiments of the disclosure.

FIG. 13 is a flowchart of illustrative steps for determining and recommending that supplemental video content be associated with a first media asset or a second media asset, in accordance with some embodiments of the disclosure. For example, a media guidance application may instruct control circuitry 404 to execute the elements of process 1300. In this way, the media guidance application may recommend programs to supplemental video providers that users are most likely to be engaged in. This may ultimately allow supplemental video providers to reach the widest audience efficiently by showing their supplemental video content during the most viewed media assets.

Process 1300 begins at 1302, where the media guidance application infers (e.g., via control circuitry 404) a first viewing amount representing how much of a first media asset was viewed by a first plurality of users. The media guidance application may infer the first viewing amount in a manner similar to that described in relation to process 600 in FIG. 6, more particularly, as described in relation to 620 of process 600 in FIG. 6. For example, the media guidance application may determine (e.g., via control circuitry 404) that the first viewing amount is 75%.

Process 1300 continues to 1304, where the media guidance application infers (e.g., via control circuitry 404) a second viewing amount representing how much of a first media asset was viewed by a first plurality of users. The media guidance application may infer the second viewing amount in a manner similar to that described in relation to process 600 in FIG. 6, more particularly, as described in relation to 620 of process 600 in FIG. 6. For example, the media guidance application may determine (e.g., via control circuitry 404 that the second viewing amount is 60%.

Process 1300 continues to 1306, where the media guidance application determines (e.g., via control circuitry 404) if the first viewing amount exceeds the second viewing amount. If the media guidance application determines that the first viewing amount exceeds the second viewing amount, process 1300 continues to 1308, where the media guidance application recommends (e.g., via control circuitry 404) that supplemental video content be associated with the first media asset. The media guidance application may recommend that supplemental video content be associated with the first media asset in a similar matter as discussed in relation to 1212 of process 1200 in FIG. 12.

Returning to 1306 of process 1300, if the media guidance application determines that the first viewing amount does not exceed the second viewing amount, process 1300 continues to 1310, where the media guidance application recommends (e.g., via control circuitry 404) that supplemental video content be associated with the second media asset. The media guidance application may recommend that supplemental video content be associated with the second media asset in a similar manner as discussed in relation to 1212 of process 1200 in FIG. 12.

Figure 14:
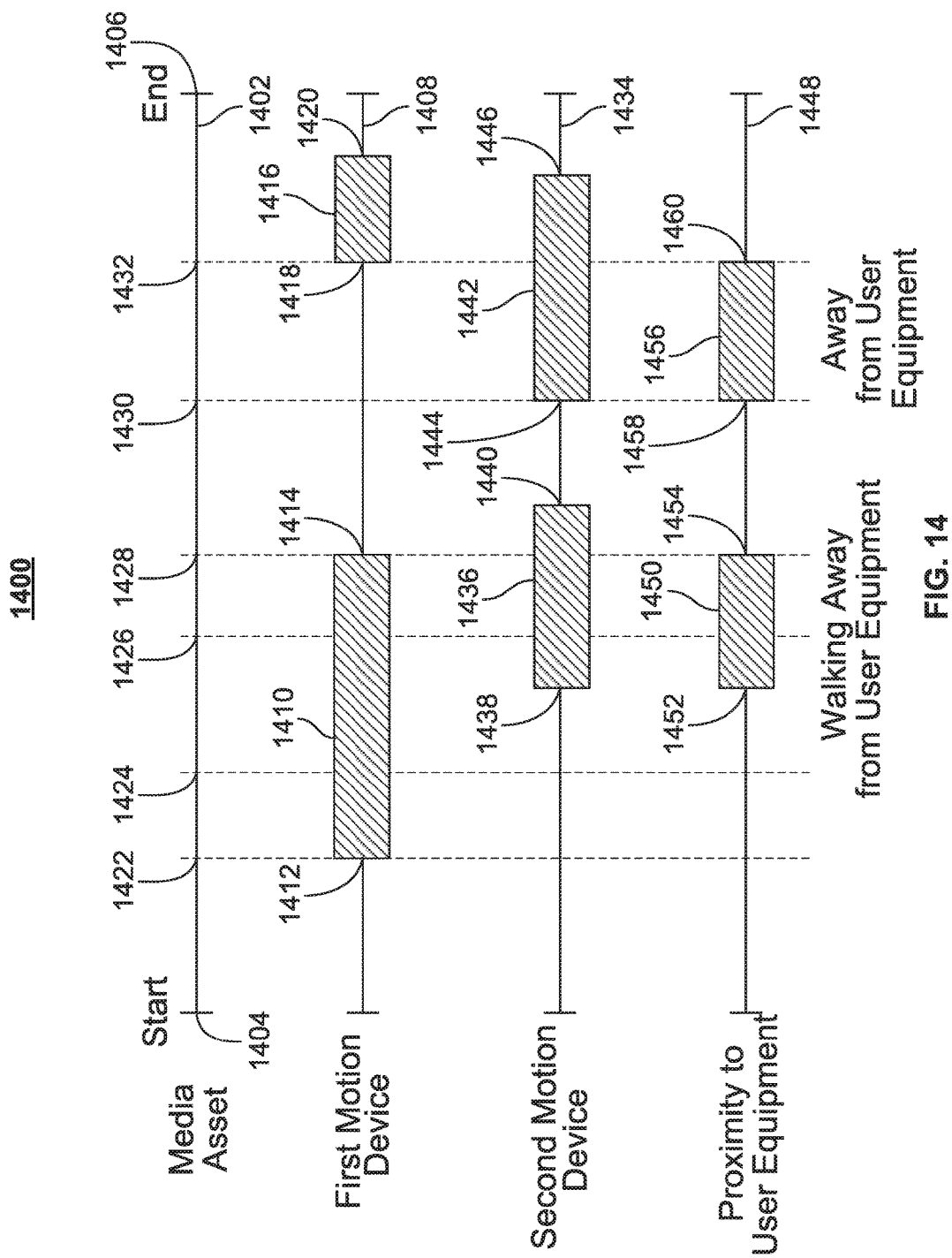
FIG. 14 shows an illustrative example of a graphic representation of information contained in illustrative data structures used to determine the proximity of a user to the user equipment, in accordance with some embodiments of the disclosure.

FIG. 14 shows an illustrative example of a graphic representation of information contained in illustrative data structures used to determine the proximity of a user to user equipment, in accordance with some embodiments of the disclosure. For example, timeline 1402 may represent a data structure representing the display of the media asset or a portion thereof, timeline 1408 may represent a first data structure received from a first motion device associated with the user equipment, timeline 1434 may represent a second data structure received from a second motion device associated with the user equipment, and timeline 1448 may represent a data structure indicating the proximity of the user to the user equipment while the user equipment device is generating for display the media asset. The data structures corresponding to timelines 1402, 1408, 1434, and 1448 may be stored in storage (e.g., storage 408) of one or more user equipment (e.g., any of the user equipment listed in FIGS. 4-5), or remotely at a server (e.g., media guidance data source 518) accessible via a communications network (e.g., communications network 514). The media guidance application may be executed by one or more user equipment (e.g., any of the user equipment listed in FIGS. 4-5) to store and fetch data from the data structures corresponding to timelines 1402, 1408, 1434, and 1448.

Timeline 1402 may represent the timeline for the display of the media asset, or a portion thereof, and may be similar to timeline 802 of FIG. 8. The media asset may start at start time 1404, and end at end time 1406. For example, the media asset may start at 0 minutes and may end at 30 minutes. Timeline 1402 may represent both the display of the media asset in addition to the display of supplemental video content. For example, a first segment of the media asset during which supplemental content is displayed may begin at start time 1422 and end at end time 1424, a second segment of the media asset during which supplemental content is displayed may begin at start time 1426 and end at end time 1428, and a third segment of the media asset during which supplemental content is displayed may begin at start time 1430 and end at end time 1432. The first segment of the media asset may be similar to the first segment as described in relation to 1202 of process 1200 in FIG. 12, and the second segment of the media asset may be similar to the second segment as described in relation to 1204 of process 1200 in FIG. 12. Inclusion of the supplemental video content in timeline 1402 may help to determine audience engagement during the supplemental video content.

Timeline 1408 may represent the movement of a first user as detected by a first motion device, which may be, for example, a camera. Timeline 1408 may be correlated to timeline 1402, and thus may represent movement occurring while the user equipment (e.g., user equipment 502, 504, and 506) is generating for display the media asset. The media guidance application may correlate timeline 1402 and timeline 1408 as described above with relation to 606 in process 600 of FIG. 6. Timeline 1408 contains two movement events, movement event 1410 and movement event 1416. Movement event 1410 may start at start time 1412 and end at end time 1414. For example, start time 1412 may be the start time of the first portion (e.g., the fifth minute of the media asset) described in 606 in process 600 of FIG. 6. End time 1414 may be the end time of the first portion (e.g. the fifteenth minute of the media asset). Start time 1412 of movement event 1410 coincides with start time 1422 of the first segment, and end time 1414 of movement event 1410 coincides with end time 1428 of the second segment, indicating that the user moved for the entirety of the first segment and the second segment. Movement event 1416 may start at start time 1418 and end at end time 1420. For example, start time 1418 may be at the twenty-fifth minute of the media asset, and end time 1420 may be at the twenty-eighth minute of the media asset.

Timeline 1434 may represent the movement of a first user as detected by a second motion device, which may be, for example, an accelerometer in a smart phone. Timeline 1434 may be correlated to timeline 1402, and thus may represent movement occurring while the user equipment (e.g., user equipment 502, 504, and 506) is generating for display the media asset. The media guidance application may correlate timeline 1402 and timeline 1434 as described above with relation to 606 in process 600 of FIG. 6. Timeline 1434 contains two movement events, movement event 1436 and movement event 1442. Movement event 1436 may start at start time 1438 and end at end time 1440. For example, start time 1438 may be at the eleventh minute of the media asset, and end time 1440 may be at the seventeenth minute of the media asset. Movement event 1442 may start at start time 1444 and end at end time 1446. For example, start time 1444 may be at the twentieth minute of the media asset, and end time 1446 may be at the twenty-seventh minute of the media asset.

Timeline 1448 may represent the proximity of the user to the user equipment while the user equipment is generating for display the media asset. Timeline 1448 may be user to determine the movement intensity of the movement events in timeline 1408 and timeline 1434. Media guidance application may determine the data structure for timeline 1448 as described above in the discussion of 604 of process 600 in FIG. 6.

Timeline 1448 contains two events indicating that the user is not proximate to the user equipment, proximity event 1450 and proximity event 1456. Proximity event 1450 starts at start time 1452 and ends at end time 1454. Proximity event 1450 may be determined as described above in relation to 604 of process 600 in FIG. 6. For example, start time 1452 may be coincident with start time 1438 of movement event 1436, the eleventh minute of the media asset. End time 844 may be coincident with end time 1414 of movement event 1410, the fifteenth minute of the media asset. As an illustrative example, the first motion device may detect the user is using his or her tablet from the fifth minute to the eleventh minute of the media asset, and may detect that the user is walking away from the user equipment from eleventh minute to the fifteenth minute of the media asset, which may be represented by movement event 1410. The second motion device may detect that the user is walking away from the user equipment from the eleventh minute to the fifteenth minute of the media asset, and walking toward the user equipment from the fifteenth minute to the seventeenth minute of the media asset, which may be represented by movement event 1438. Thus, the media guidance application may determine (e.g., via control circuitry 404) that the user was moving away from the user equipment from the eleventh minute to the fifteenth minute of the media asset based on movement event 1410 and movement event 1438. The media guidance application may determine (e.g., via control circuitry 404), based on the user moving away from the user equipment for four minutes of movement event 1410 (which is a total of ten minutes long), that the movement intensity for movement event 1410 is average, whereas the movement intensity for movement event 1436 (which is a total of six minute long) is relatively high.

The media guidance application may determine (e.g., via control circuitry 404) proximity event 1456 as described above in relation to 604 of process 600 in FIG. 6. Proximity event 1456 starts at start time 1458 and ends at end time 1460. Start time 1458 may correlate to start time 1444 of movement event 1442 (e.g., the twentieth minute), and end time 1460 may correlate to end time 1432 of the third segment (e.g., the twenty-fifth minute). As an illustrative example, the first motion device may detect that the user is walking toward the user equipment from twenty-fifth minute to the twenty-seventh minute of the media asset, and that the user is eating food from the twenty-seventh minute to the twenty-eighth minute of the media asset which may be represented by movement event 1416. The second motion device may detect that the user is in the kitchen from the twentieth minute to the twenty-fifth minute of the media asset, and walking toward the user equipment from the twenty-fifth minute to the twenty-seventh minute of the media asset, which may be represented by movement event 1442. Thus, the media guidance application may determine (e.g., via control circuitry 404) that the user was away from the user equipment from the twentieth minute to the twenty-fifth minute of the media asset based on movement event 1416 and movement event 1456. The media guidance application may determine (e.g., via control circuitry 404), based on the user being in the kitchen for five minutes of movement event 1442, that the movement intensity for movement event 1442 is very high. Because the user was proximate to the user equipment for the duration of movement event 1416, the movement intensity for movement event 1416 may be relatively low.

The above-described embodiments of the present disclosure are presented for purposes of illustration and not of limitation, and the present disclosure is limited only by the claims that follow. Additionally, it should be noted that any of the devices or equipment discussed in relation to FIGS. 4-5 could be used to perform one or more of the steps in processes 600-700 and 900-1300 in FIGS. 6-7 and 9-13, respectively. Furthermore, it should be noted that the features and limitations described in any one embodiment may be applied to any other embodiment herein, and flowcharts or examples relating to one embodiment may be combined with any other embodiment in a suitable manner, done in different orders, performed with addition steps, performed with omitted steps, or done in parallel. For example, each of these steps may be performed in any order or in parallel or substantially simultaneously to reduce lag or increase the speed of the system or method. In addition, the systems and methods described herein may be performed in real time. It should also be noted that the systems and/or methods described above may be applied to, or used in accordance with, other systems and/or methods.

What is claimed is:

1. A method for measuring audience engagement based on user motion, the method comprising:
determining, using control circuitry, that a plurality of user equipment corresponding to a plurality of users are generating for display a media asset, wherein a first user equipment of the plurality of user equipment corresponds to a first user of the plurality of users, and wherein a second user equipment of the plurality of user equipment corresponds to a second user of the plurality of users;
obtaining, with the control circuitry, from the plurality of user equipment, user movement data indicating that a subset of the plurality of users have moved during a time period, wherein the subset of the plurality of users correspond to a subset of the plurality of user equipment;
determining, using the control circuitry, a portion of the media asset corresponding to the time period;
computing, using the control circuitry, a value indicating how many of the plurality of users were moving during the portion of the media asset based on the subset of the plurality of users;
based on determining that the value exceeds a threshold value, computing, using the control circuitry, a number of users who were not engaged in watching the portion of the media asset; and
inferring, using the control circuitry, based on the number of users and the portion of the media asset, how much of the media asset was viewed by the plurality of users.

2. The method of claim 1, wherein the determining, using the control circuitry, the portion of the media asset corresponding to the time period comprises:
obtaining a first movement log from the first user equipment and a second movement log from the second user equipment, wherein each of the first and second movement logs comprises a data structure representing a plurality of movement events occurring while the user equipment, from which the movement log is received, is generating for display the media asset, and wherein the plurality of movement events are detected using a motion sensor associated with the user equipment from which the movement log is received;
identifying, using the control circuitry, based on the data structure of the first movement log, a first portion of the media asset during which the first user was moving;
identifying, using the control circuitry, based on the data structure of the second movement log, a second portion of the media asset during which the second user was moving; and
determining the portion of the media as an overlapping portion of the first portion and the second portion.

3. The method of claim 2, wherein the plurality of movement events of the data structure of the first movement log are associated with movement of the first user, the method further comprising:
determining, using the control circuitry, that the first user equipment corresponds to a third user;
receiving, with the control circuitry, a third movement log from the first user equipment, wherein the third movement log comprises a data structure representing a plurality of movement events associated with movement of the third user;
determining, based on the data structure of the third movement log using the control circuitry, whether the third user was moving during the entirety of the overlapping portion; and
wherein the value indicating how many of the plurality of users were moving for the entirety of the overlapping portion is increased based on determining that the third user was moving during the entirety of the overlapping portion.

4. The method of claim 2, wherein the data structure of the first movement log comprises a plurality of movement intensities associated with the plurality of movement events associated with the first movement log, the method further comprising:
determining a subset of the movement events associated with the first movement log, wherein the subset of the movement events occurred during the overlapping portion;
computing, using the control circuitry, an aggregated movement intensity associated with the overlapping portion based on the subset of the movement events;
comparing, using the control circuitry, the aggregated movement intensity to a threshold movement intensity;
based on determining that the aggregated movement intensity exceeds the threshold movement intensity, determining, using the control circuitry, that the first user was moving during the overlapping portion; and
wherein inferring how much of the media asset was viewed by the plurality of users is further based on the determining that the first user was moving during the overlapping portion and the aggregated movement intensity.

5. The method of claim 1, wherein the computing, using the control circuitry, the number of users who were not engaged in watching the portion of the media asset comprises:
computing a first movement amount of the media asset during which the users corresponding to the portion of the plurality of user equipment were moving based on the overlapping portion,
wherein the value is a first value, wherein the media asset comprises a first segment and a second segment, and wherein the overlapping portion is a first overlapping portion and occurs during the first segment:
computing a second movement amount of the first segment during which the users corresponding to the first portion of the plurality of user equipment were moving based on the first overlapping portion;
determining a second value, wherein the second value indicates how many of the plurality of users were moving for an entirety of a second overlapping portion, wherein the second overlapping portion occurs during the second segment;

based on determining that the second value exceeds the threshold, computing a third movement amount of the second segment during which users corresponding to a second portion of the plurality of user equipment were moving based on the second overlapping portion;

inferring, based on the second movement amount, a first viewing amount, wherein the first viewing amount represents how much of the first segment was viewed by the plurality of users;

inferring, based on the third movement amount, a second viewing amount, wherein the second viewing amount represents how much of the second segment was viewed by the plurality of users;

comparing, the first viewing amount to the second viewing amount to determine that the first viewing amount is greater than the second viewing amount; and in response to determining that the first viewing amount is greater than the second viewing amount, recommending that supplemental video content be associated with the first segment of the media asset;

automatically associating the supplemental video content with the first segment of the media asset; and storing, in a database using the control circuitry, an association data structure identifying the first segment and the supplemental video content.

6. The method of claim 5, wherein the first segment is associated with a first characteristic, wherein the second segment is associate with a second characteristic, and wherein the media asset is a first media asset, the method further comprising:

identifying, using the control circuitry, a second media asset comprising a third segment associated with the first characteristic; and recommending, using the control circuitry, that the supplemental video content be associated with the third segment of the second media asset.

7. The method of claim 1, wherein the media asset is a first media asset, wherein the plurality of users is a first plurality of users, and wherein inferring how much of the first media asset was viewed by the first plurality of users comprises determining a first viewing amount, wherein the first viewing amount represents how much of the first media asset was viewed by the first plurality of users, the method further comprising:

determining, using the control circuitry, a second viewing amount, wherein the second viewing amount represents how much of a second media asset was viewed by a second plurality of users;

comparing, using the control circuitry, the first viewing amount to the second viewing amount to determine whether the first viewing amount exceeds the second viewing amount; and in response to determining that the first viewing amount exceeds the second viewing amount, recommending, using the control circuitry, that supplemental video content be associated with the first media asset.

8. The method of claim 1, wherein inferring how much of the media asset was viewed by the plurality of users comprises:

accessing, using the control circuitry, a function correlating the movement amount to a viewing amount, wherein the viewing amount represents how much of the first media asset was viewed by the plurality of users, and wherein the function inversely correlates the movement amount to the viewing amount; and evaluating, using the control circuitry, the function to determine the viewing amount by inputting the movement amount into the function.

9. The method of claim 1, further comprising:

receiving, with the control circuitry from the plurality of user equipment, a plurality of indications of requests for media; and determining, based on the plurality of indications using the control circuitry, that the plurality of user equipment are generating for display the media asset.

10. The method of claim 9, wherein an indication of a request of the plurality of indications comprises an indication of a source and an indication of a time of the request, and further comprising:

receiving, with the control circuitry from a database, a presentation data table, wherein the presentation data table indicates that a plurality sources are providing a plurality of media assets at a plurality of display times, and wherein the presentation data table indicates that the source is providing the media asset at the time;

comparing the source to the plurality of sources and the time to the plurality of display times to determine that the request is associated with the media asset.

11. A system for measuring audience engagement based on user motion, the system comprising:

memory;

communication circuitry; and control circuitry configured to:

determine that a plurality of user equipment corresponding to a plurality of users are generating for display a media asset, wherein a first user equipment of the plurality of user equipment corresponds to a first user of the plurality of users, and wherein a second user equipment of the plurality of user equipment corresponds to a second user of the plurality of users;

obtain, via the communication circuitry, from the plurality of user equipment, user movement data indicating that a subset of the plurality of users have moved during a time period, wherein the subset of the plurality of users correspond to a subset of the plurality of user equipment;

determine a portion of the media asset corresponding to the time period;

compute a value indicating how many of the plurality of users were moving during the portion of the media asset based on the subset of users;

based on determining that the value exceeds a threshold value, compute a number of users who were not engaged in watching the portion of the media asset; and infer based on the number of users and the portion of the media asset, how much of the media asset was viewed by the plurality of users.

12. The system of claim 11, wherein the control circuitry is further configured, when determining, using the control circuitry, the portion of the media asset corresponding to the time period, to:

obtain a first movement log from the first user equipment and a second movement log from the second user equipment, wherein each of the first and second movement logs comprises a data structure representing a plurality of movement events occurring while the user equipment, from which the movement log is received, is generating for display the media asset, and wherein the plurality of movement events are detected using a motion sensor associated with the user equipment from which the movement log is received;
identify based on the data structure of the first movement log, a first portion of the media asset during which the first user was moving;
identify based on the data structure of the second movement log, a second portion of the media asset during which the second user was moving; and
determine the portion of the media as an overlapping portion of the first portion and the second portion.

13. The system of claim 12, wherein the plurality of movement events of the data structure of the first movement log are associated with movement of the first user, and the control circuitry is further configured to:
determine that the first user equipment corresponds to a third user;
receive a third movement log from the first user equipment, wherein the third movement log comprises a data structure representing a plurality of movement events associated with movement of the third user;
determine, based on the data structure of the third movement log using the control circuitry, whether the third user was moving during the entirety of the overlapping portion; and
wherein the value indicating how many of the plurality of users were moving for the entirety of the overlapping portion is increased based on determining that the third user was moving during the entirety of the overlapping portion.

14. The method of claim 12, wherein the data structure of the first movement log comprises a plurality of movement intensities associated with the plurality of movement events associated with the first movement log, and the control circuitry is further configured to:
determine a subset of the movement events associated with the first movement log, wherein the subset of the movement events occurred during the overlapping portion;
compute an aggregated movement intensity associated with the overlapping portion based on the subset of the movement events;
compare the aggregated movement intensity to a threshold movement intensity;
based on determining that the aggregated movement intensity exceeds the threshold movement intensity, determine that the first user was moving during the overlapping portion; and
wherein inferring how much of the media asset was viewed by the plurality of users is further based on the determining that the first user was moving during the overlapping portion and the aggregated movement intensity.

15. The system of claim 11, wherein the control circuitry is further configured, when computing, using the control circuitry, the number of users who were not engaged in watching the portion of the media asset, to:
compute a first movement amount of the media asset during which the users corresponding to the portion of the plurality of user equipment were moving based on the overlapping portion,
wherein the value is a first value, wherein the media asset comprises a first segment and a second segment, and wherein the overlapping portion is a first overlapping portion and occurs during the first segment:
compute a second movement amount of the first segment during which the users corresponding to the first portion of the plurality of user equipment were moving based on the first overlapping portion;
determine a second value, wherein the second value indicates how many of the plurality of users were moving for an entirety of a second overlapping portion, wherein the second overlapping portion occurs during the second segment;
based on determining that the second value exceeds the threshold, compute a third movement amount of the second segment during which users corresponding to a second portion of the plurality of user equipment were moving based on the second overlapping portion;
infer, based on the second movement amount, a first viewing amount, wherein the first viewing amount represents how much of the first segment was viewed by the plurality of users;
infer, based on the third movement amount, a second viewing amount, wherein the second viewing amount represents how much of the second segment was viewed by the plurality of users;
compare, the first viewing amount to the second viewing amount to determine that the first viewing amount is greater than the second viewing amount; and
in response to determining that the first viewing amount is greater than the second viewing amount, recommend that supplemental video content be associated with the first segment of the media asset;
automatically associate the supplemental video content with the first segment of the media asset; and
store, in a database using the control circuitry, an association data structure identifying the first segment and the supplemental video content.

16. The system of claim 15, wherein the first segment is associated with a first characteristic, wherein the second segment is associate with a second characteristic, and wherein the media asset is a first media asset, and the control circuitry is further configured to:
identify, using the control circuitry, a second media asset comprising a third segment associated with the first characteristic; and
recommend, using the control circuitry, that the supplemental video content be associated with the third segment of the second media asset.

17. The system of claim 11, wherein the media asset is a first media asset, wherein the plurality of users is a first plurality of users, and wherein inferring how much of the first media asset was viewed by the first plurality of users comprises determining a first viewing amount, wherein the first viewing amount represents how much of the first media asset was viewed by the first plurality of users, and the control circuitry is further configured to:
determine a second viewing amount, wherein the second viewing amount represents how much of a second media asset was viewed by a second plurality of users;
compare the first viewing amount to the second viewing amount to determine whether the first viewing amount exceeds the second viewing amount; and
in response to determining that the first viewing amount exceeds the second viewing amount, recommend that supplemental video content be associated with the first media asset.

18. The system of claim 11, wherein the control circuitry is further configured, when inferring how much of the media asset was viewed by the plurality of users, to:
access, using the control circuitry, a function correlating the movement amount to a viewing amount, wherein the viewing amount represents how much of the first media asset was viewed by the plurality of users, and wherein the function inversely correlates the movement amount to the viewing amount; and evaluate, using the control circuitry, the function to determine the viewing amount by inputting the movement amount into the function.

19. The system of claim 11, wherein the control circuitry is further configured to:

receive from the plurality of user equipment, a plurality of indications of requests for media; and determine, based on the plurality of indications using the control circuitry, that the plurality of user equipment are generating for display the media asset.

20. The system of claim 19, wherein an indication of a request of the plurality of indications comprises an indication of a source and an indication of a time of the request, and the control circuitry is further configured to:

receive, with the control circuitry from a database, a presentation data table, wherein the presentation data table indicates that a plurality sources are providing a plurality of media assets at a plurality of display times, and wherein the presentation data table indicates that the source is providing the media asset at the time;

compare the source to the plurality of sources and the time to the plurality of display times to determine that the request is associated with the media asset.

* * * * *